US012223929B1

(12) United States Patent
Spangler et al.

(10) Patent No.: US 12,223,929 B1
(45) Date of Patent: Feb. 11, 2025

(54) FOLDABLE ACOUSTIC STRINGED INSTRUMENT

(71) Applicant: Ciari Guitars, inc., San Diego, CA (US)

(72) Inventors: Jonathan Spangler, San Diego, CA (US); G. Bryan Cornwall, Poway, CA (US); Brion Daffinson, Marietta, GA (US); Linc Cholke, Vernon Hills, IL (US)

(73) Assignee: Ciari Guitars, Inc., San Diego, CA (US)

( * ) Notice: Subject to any disclaimer, the term of this patent is extended or adjusted under 35 U.S.C. 154(b) by 252 days.

(21) Appl. No.: 17/992,207

(22) Filed: Nov. 22, 2022

Related U.S. Application Data

(60) Provisional application No. 63/282,140, filed on Nov. 22, 2021.

(51) Int. Cl.
*G10D 3/095* (2020.01)

(52) U.S. Cl.
CPC .................................... *G10D 3/095* (2020.02)

(58) Field of Classification Search
CPC ................................. G10D 3/00; G10D 3/095
See application file for complete search history.

(56) References Cited

U.S. PATENT DOCUMENTS 4,111,093 A * 9/1978 Field ...................... G10D 3/095
984/106

* cited by examiner

*Primary Examiner* — Kimberly R Lockett
(74) *Attorney, Agent, or Firm* — Jonathan D. Spangler; Jay B. Bell

(57) ABSTRACT

A foldable acoustic guitar having a foldable neck assembly and a hollow body with at least one sound hole and a neck channel formed in the back for receiving a section of the neck assembly while the guitar is in a folded configuration. An actuator assembly is disposed in a recess formed in the body opposite the foldable neck. The actuator assembly serves to selectively loosen and tighten the strings in order to enable folding and unfolding of the guitar for travel/ storage or play, respectively. While in the playing configuration, a user of the guitar may create any of a variety of musical notes by depressing the various strings between the various frets as known in the art. While in the folded configuration, a user can place the folded guitar in a backpack or other compact bag or carry-case for stress-free mobility or convenient storage.

20 Claims, 51 Drawing Sheets

FOLDABLE ACOUSTIC STRINGED INSTRUMENT

CROSS REFERENCES TO RELATED APPLICATIONS

The present application is non-provisional patent application claiming benefit under 35 USC Section 119(e) from U.S. Provisional Patent Application Ser. No. 63/282,140 filed Nov. 22, 2022, entitled "Foldable Acoustic Stringed Instrument," the entire content of which is hereby expressly incorporated by reference into this disclosure as if set forth fully herein.

BACKGROUND OF THE INVENTION

I. Field of the Invention

The present invention relates generally to stringed musical instruments and, more particularly, to an acoustic stringed musical instrument (e.g. an acoustic guitar) capable of being played anywhere but configured to assume a reduced profile for ease of travel and/or compact storage.

II. Discussion of the Prior Art

Stringed instruments, such as guitars, have enjoyed among the highest popularity among musical instruments. Most stringed instruments have a solid neck rigidly coupled to either a hollow or solid body. This construction, while aiding in predictable tuning and quality of play, render many stringed instruments cumbersome for travel (e.g. air, train, auto, etc. . . . ), particularly given the additional bulk of the associated case (hard or soft). While various stringed instruments have been attempted to make it easier and/or more convenient to travel with or store these stringed instruments, most are simply smaller or scaled down versions of their traditional counterparts, which still present challenges for travel and/or predictable tuning and quality of play. Other options remove the neck, which is cumbersome and time-consuming during breakdown and set-up. The present invention is directed at overcoming, or at least improving upon, the disadvantages of the prior art.

SUMMARY OF THE INVENTION

The present invention accomplishes this goal by providing a foldable stringed instrument in the form (by way of example only) of an acoustic guitar that folds mid-neck to assume a reduced profile. While referred to hereinafter within the context of an acoustic guitar, it will be appreciated that the scope of the invention extends beyond guitars and may include, by way of example only, any of a variety of acoustic stringed instrument that would benefit from a reduced profile for ease of travel and/or storage (e.g. banjo, ukulele, etc. . . . ). According to one aspect, the foldable guitar may be configured to house or receive or otherwise couple to a tablet computer (e.g. iPad by Apple, Inc.) and/or a smart phone (e.g. iPhone by Apple, Inc.) having one or more applications (apps) for driving the operation, functionality and/or effects associated with the travel guitar. According to one aspect, the mid-neck folding is accomplished in a symmetrical manner about a three-part hinge located in the neck to configure the travel guitar into a reduced profile.

The foldable acoustic guitar may be made from any number of suitable materials via any number of suitable manufacturing techniques. For example, according to one aspect, the body of the foldable acoustic guitar may be made from carbon fiber using any known or later-developed techniques for making the body from carbon fiber (e.g. injection molded, lay-up carbon fiber strips in a mold, etc. . . . ). In another aspect, the body of the foldable acoustic guitar may made from plastic (such as the Ovation guitar). In another aspect, the body of the foldable acoustic guitar may be made of a combination of wood and carbon fiber and/or plastic.

The acoustic travel guitar includes a folding system for folding and unfolding the guitar for convenient travel and/or storage. The folding system includes a 3-part hinge forming part of the neck of the guitar, as well as a translating tail piece assembly (also referred to as an "actuator") mounted in an end recess formed in the body of the guitar. An optional locking assembly may be provided, either coupled to the actuator or independent to the actuator, for selectively locking and unlocking the 3-part hinge.

In one aspect, the strings may be configured to have modest tension (e.g. 1-5 pounds of force) after the translating tail piece assembly/actuator has been actuated to automatically loosen/detension the strings. In this manner, the strings will automatically "follow the fold" when the neck hinge assembly is in the folded configuration and avoid any vertical and/or lateral translation that would cause the strings to disengage from the neck.

In another aspect, the foldable stringed instrument includes at least one on-board electrical component and at least one electrical connector to establish electrical communication between the at least one on-board electrical component and at least one external component.

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein:

FIGS. 44-46 are perspective and partial sectional side views of the foldable acoustic guitar of FIGS. 1-2 illustrating an initial step in the unfolding process, namely straightening the neck and opening the actuator according to aspects of the present invention;

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. The acoustic foldable guitar disclosed herein boasts a variety of inventive features and components that warrant patent protection, both individually and in combination.

Figure 1:
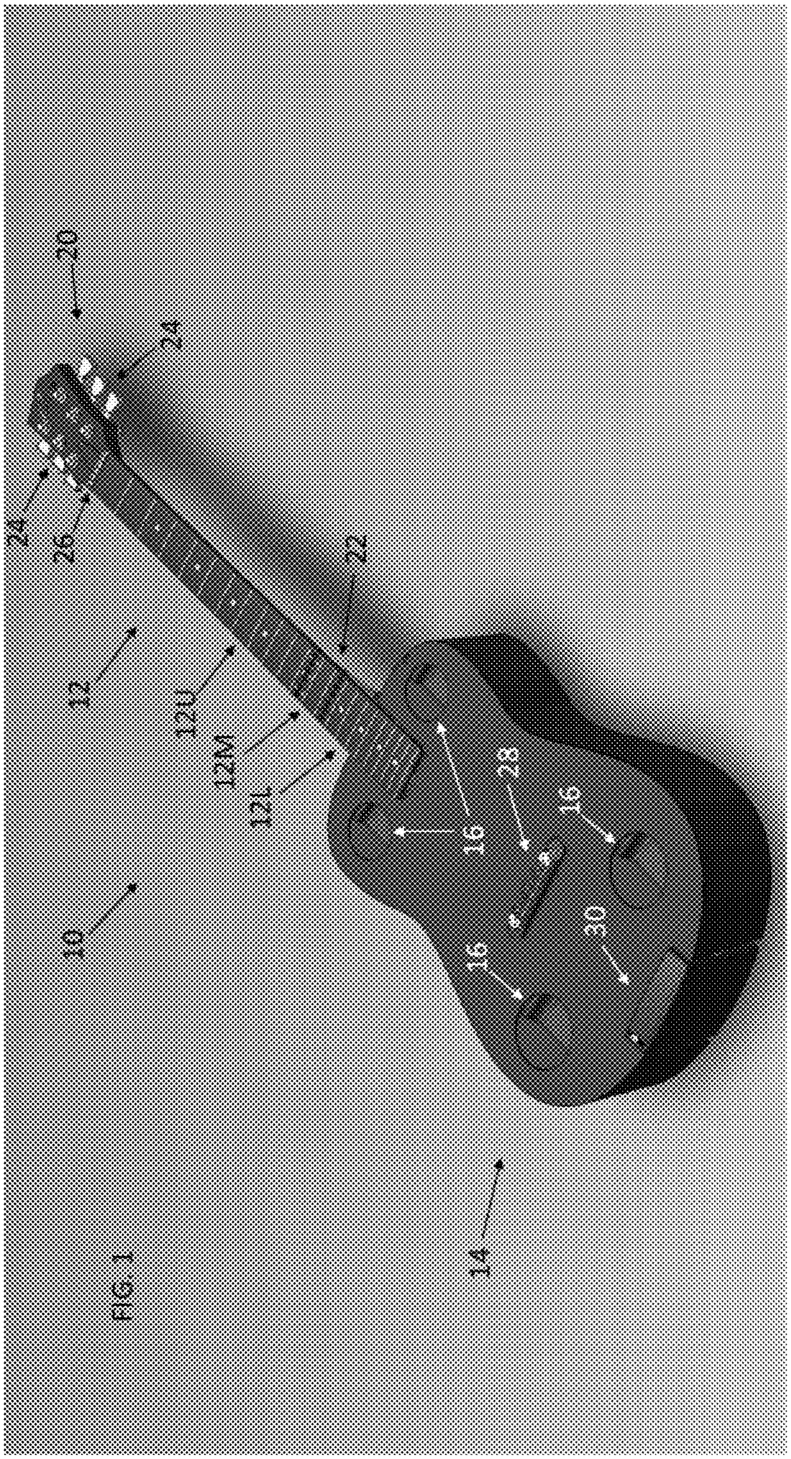
FIGS. 1-2 are front and back perspective views, respectively, of a foldable acoustic guitar in the playing position according to an aspect of the present invention.
Figure 3:
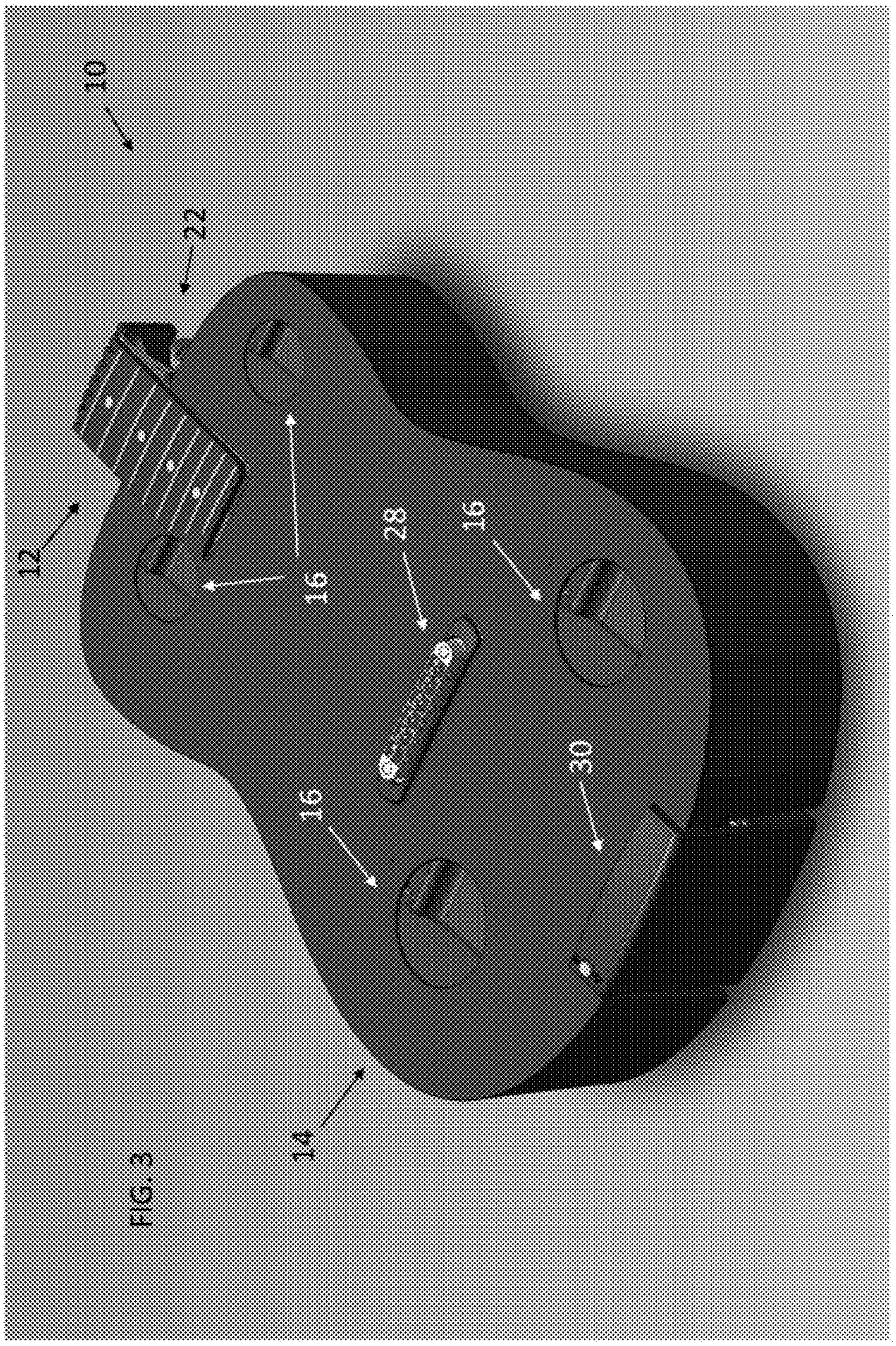
FIGS. 3-4 are front and back perspective views, respectively, of the foldable acoustic guitar of FIGS. 1-2 in the folded position according to an aspect of the present invention.
Figure 4:
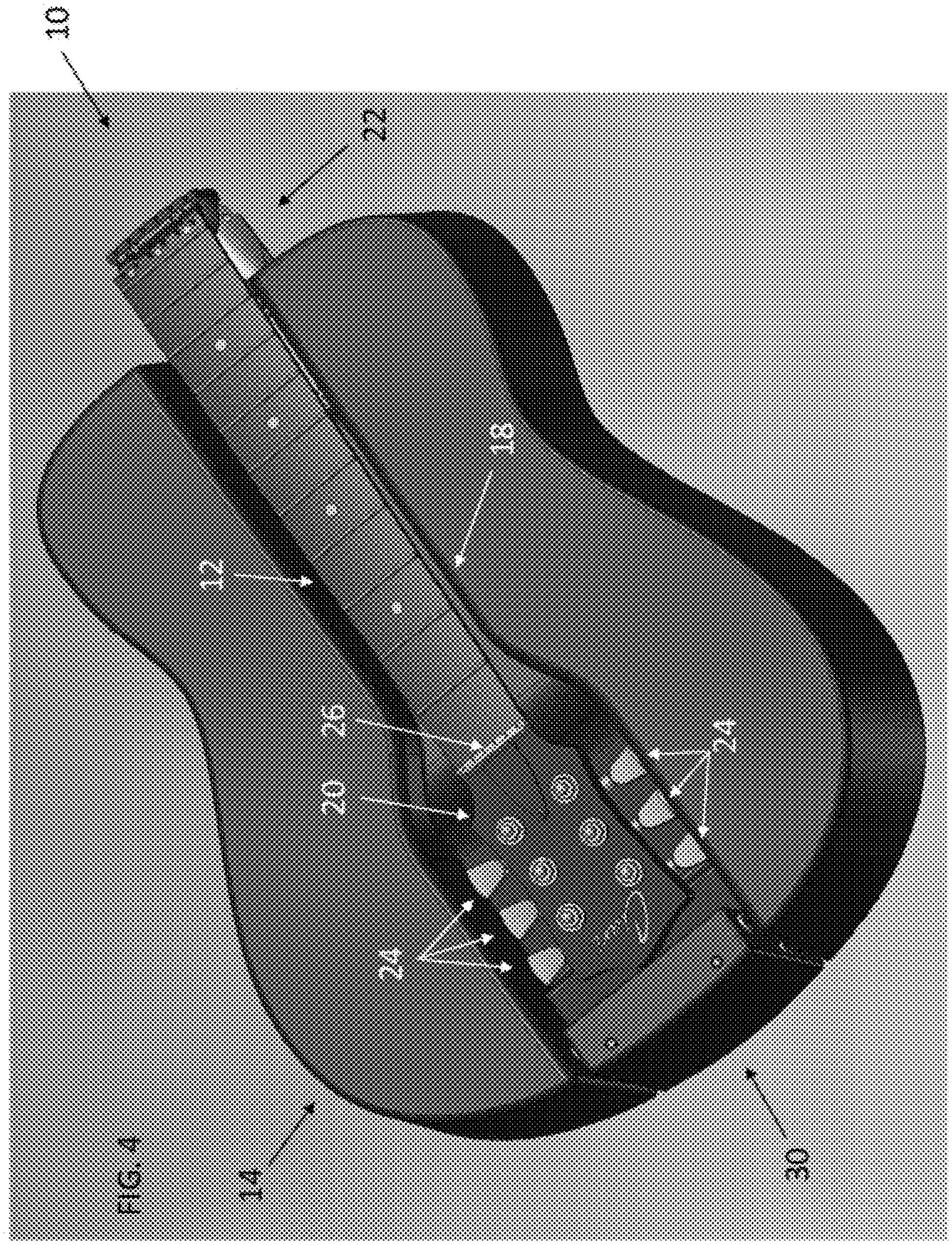

A foldable acoustic guitar 10 according to one aspect is disclosed in both the straight, playing configuration (FIGS. 1-2) and the folded configuration (FIGS. 3-4), each shown without strings in the interest of clarity. The acoustic guitar 10 includes a neck 12 and a body 14 having a plurality of sound holes 16 and a neck channel 18 formed in the back. The neck 12 includes a headstock 20 and a 3-part hinge assembly 22 which separates the neck 12 into a lower neck portion 12L (coupled to the body 14), an upper neck portion 12U (closest to the head stock 20), and a middle neck portion 12M (extending therebetween). Each neck portion 12L, 12M, 12U includes a fretboard section having a plurality of frets, which are short metallic bars extending the width of the neck 12 spaced apart in decreasing order as they progress from the upper neck portion 12U to the lower neck portion 12L. A set of strings (not shown) extend from tuning machines 24 on the headstock 18, over a nut 26 coupled to the headstock 18, onward over a saddle 28 mounted to the upper surface (sound board) of the body 14, and onward to an actuator assembly 30 mounted on the end of the body 14. As will be described below, the actuator assembly 30 serves to selectively loosen and tighten the strings in order to enable folding and unfolding of the guitar 10 for travel/ storage or play, respectively. While in the playing configuration (FIGS. 1-2), a user of the guitar 10 may create any of a variety of musical notes by depressing the various strings between the various frets as known in the art. While in the folded configuration (FIGS. 3-4), a user can place the folded guitar 10 in a backpack or other compact bag or carry-case for stress-free mobility or convenient storage.

Figure 6:
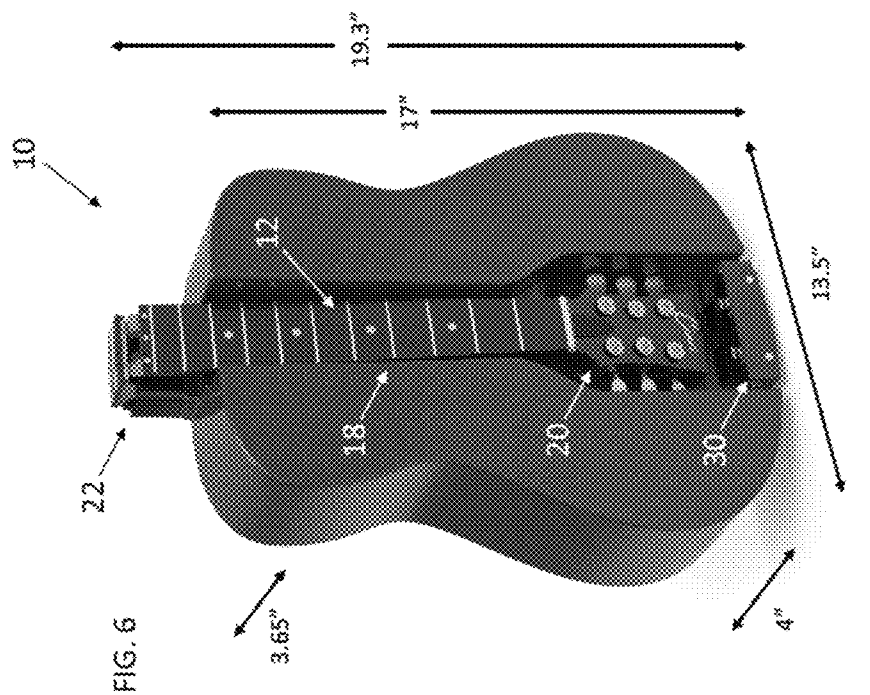
FIGS. 5-6 are front views of the foldable acoustic guitar in the playing position and folded position, respectively, setting forth exemplary dimensions according to an aspect of the present invention.
Figure 5:
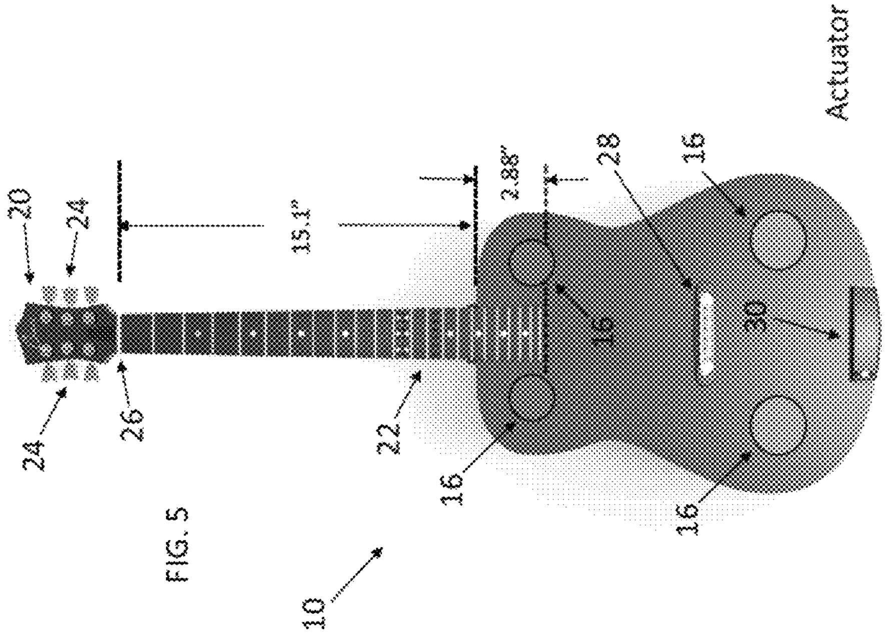

The foldable acoustic guitar 10 may be dimensioned in any of a variety of suitable manners without departing from the scope of the invention. In one illustrative embodiment, shown in FIGS. 5-6 by way of example only, the foldable acoustic guitar 10 is dimensioned as follows: Length of body 14=17 inches; maximum width of body 14=13.5 inches; overall length of folded guitar 10=19.3 inches; minimum depth of body 14=3.65 inches; maximum depth of body 14=4 inches; length of body 14 to nut 26=15.1 inches; length from end of lower neck section 12L to the nut 26=17.97 inches. Any or all of these parameters may be modified without departing from the scope of the invention. In similar fashion, the number and shape of the sound holes 16 shown in FIGS. 1-4 (by way of example only) may be modified in any suitable manner without departing from the scope of the invention. For example, the sound holes 16 in the upper surface (sound board) of the body 14 may be larger, smaller, and/or positioned in alternate locations, as well as created with shapes other than the generally circular openings shown in FIGS. 1-4. The sound hole 16 located on the side of the body 14 (see FIG. 2) may be larger, small, or positioned in other locations than shown without departing from the scope of the invention. The sound hole 16 in the side is intended to direct or project sound from the internal chamber of the body 14 primarily towards the player of the foldable acoustic guitar 10, whereas the sound holes 16 on the upper surface of the body 14 are intended to direct or project sound from the internal chamber of the body 14 primarily towards the audience.

Figure 7:
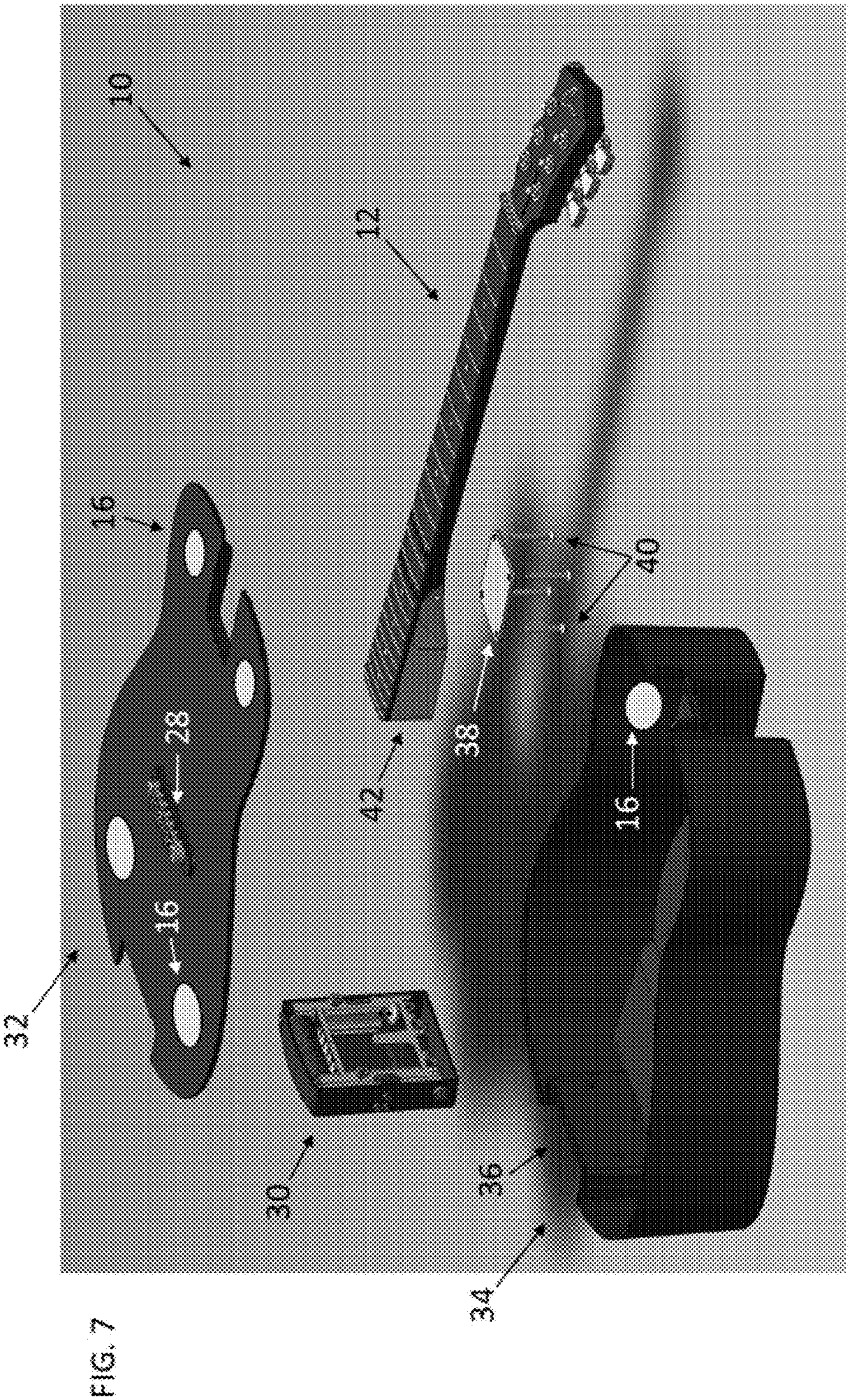
FIG. 7 is an exploded view of the foldable acoustic guitar of FIGS. 1-2 in the playing position, illustrating the body (soundboard and base), an actuator to be mounted within an end recess of the body, and a neck assembly with a mid-neck hinge for folding and unfolding under direction of the actuator according to aspects of the present invention.
Figure 8:
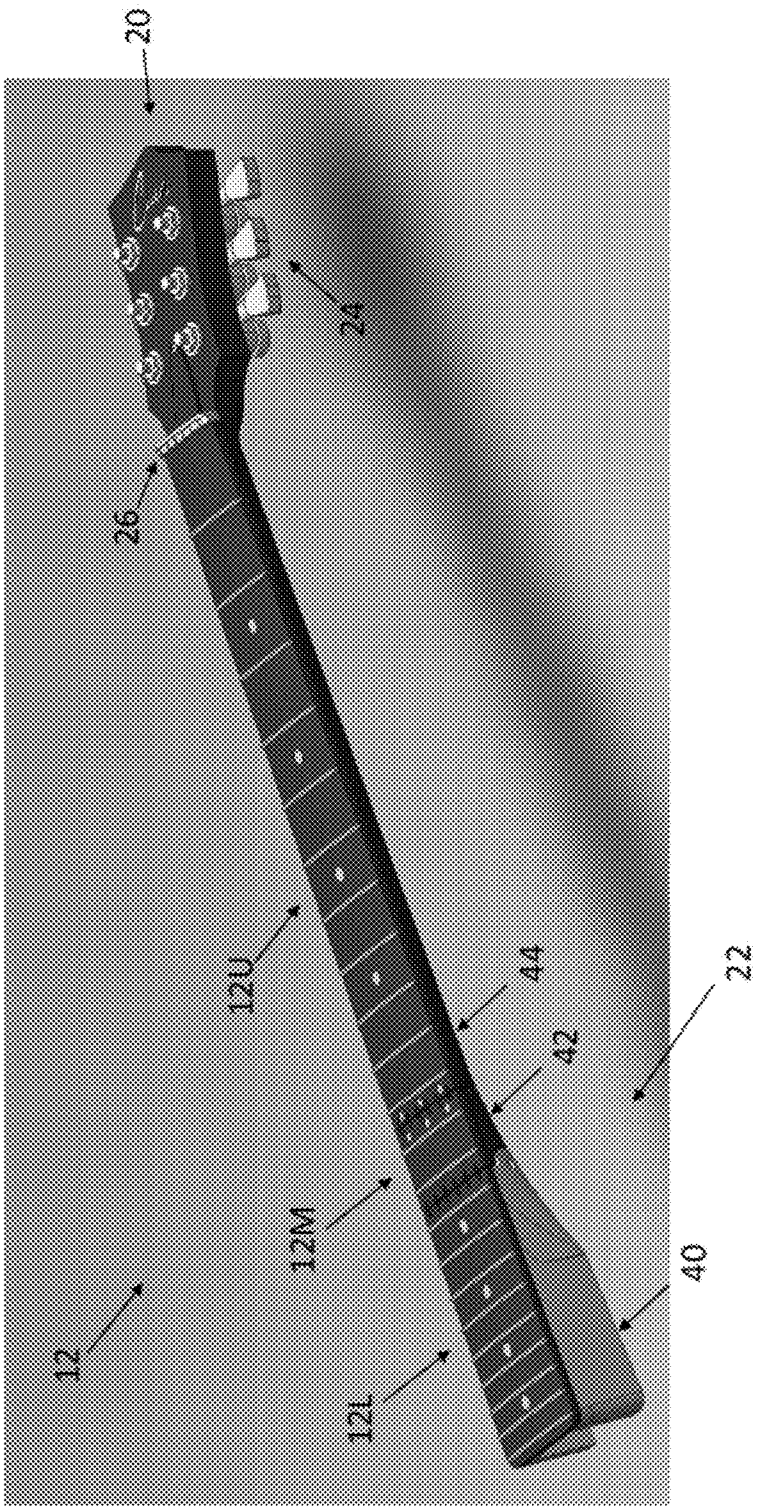
FIGS. 8-11 are perspective, top, bottom, and side views of the neck assembly of the foldable acoustic guitar of FIGS. 1-2 according to an aspect of the present invention.
Figure 9:
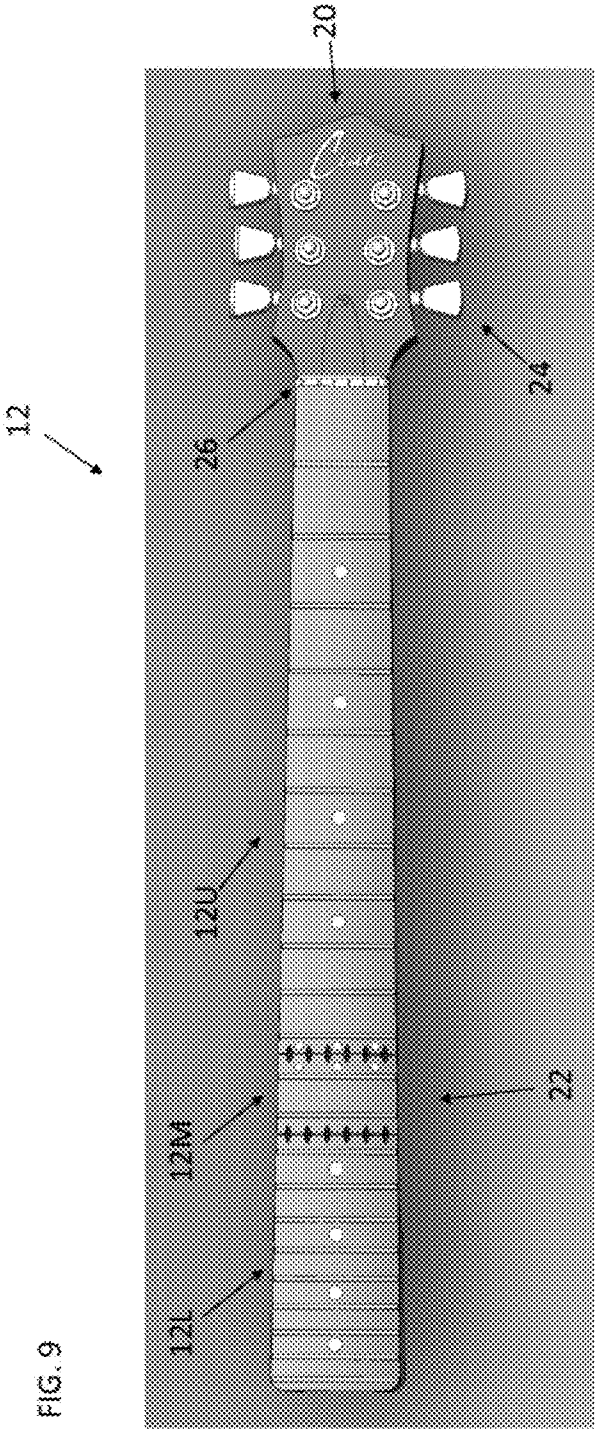
Figure 10:
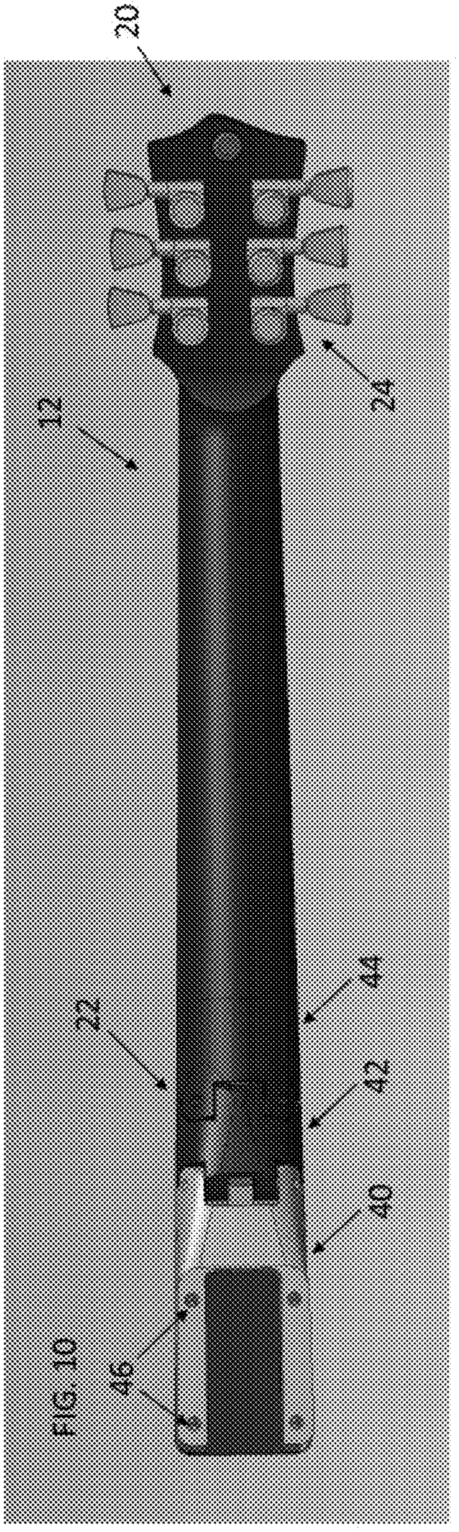
Figure 11:
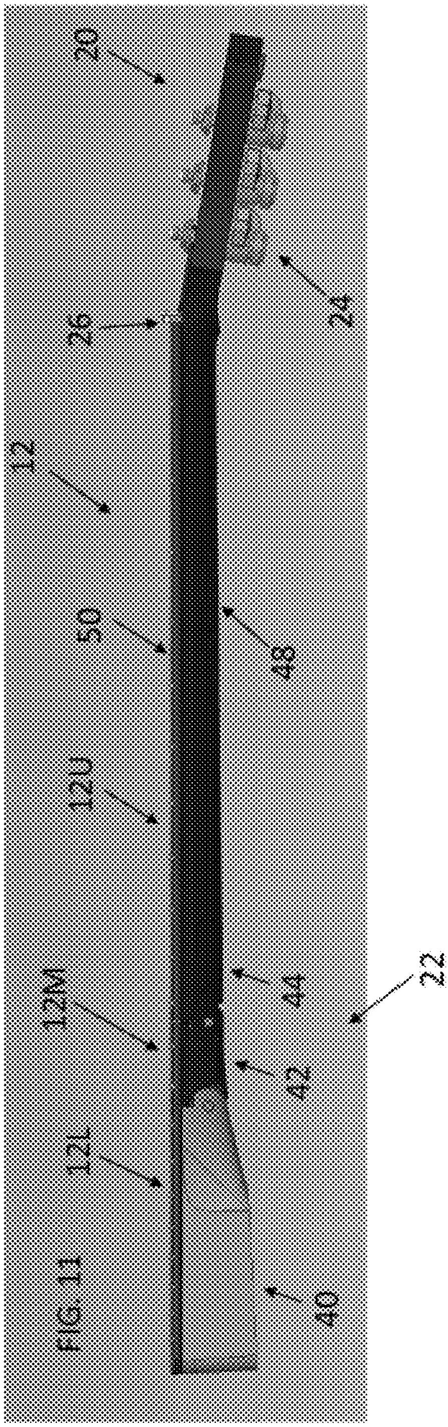

FIG. 7 is an exploded view of the foldable acoustic guitar 10 to aid in understanding of the construction according to one aspect of the present invention. The body 14 is comprised of a soundboard 32 and a base 34, the actuator 30 is mounted along a recess 36 of the body 14 in a perpendicular manner relative to the soundboard 32, and the neck 12 is mounted to the body 14 using a neck plate 38 and a plurality of machine screws 40 that thread into a base 42 of the 3-part hinge 22. The soundboard 32 and base 34 may be constructed from a variety of suitable materials, including but not limited to artificial materials such as carbon fiber or other polymers/plastics and/or any suitable species of wood, including but not limited to Polonia.

The neck 12, as shown in FIGS. 8-11, includes the 3-part hinge 22 having a middle link 42, an upper link 44, and the base 40. The middle link 42 is hingedly coupled to each of the upper link 44 and the base 40 via one or more hinge pins. The 3-part hinge 22 may be made from any suitable material with properties such that, when straightened, the neck 12 can withstand the forces of the strings (approximately 118 lbs. of tension) to maintain the neck in a playable, straight configuration. With the exception of the hardware (e.g., tuning machines 24 and frets), the remaining parts of the neck 12 (e.g. elongate neck section 48 contiguous with the headstock 20, fingerboard 50, nut 26) may be constructed from wood and/or carbon fiber or other artificial materials. It is also within the scope of the invention to construct the 3-part hinge 22 and the remaining parts of the neck 12 (except the frets and tuners 24) from carbon fiber or other material with sufficient structural properties to withstand the forces exerted by the strings during the playing configuration and also the folding and unfolding processes over time. The tuning machines 24 on the headstock 20 are preferably locking tuners, although other non-locking versions may also be used without departing from the scope of the invention. The scale length of the neck 12 (that is, the distance between the nut 26 and the saddle 28) is preferably 24 and 34 inches, although other scale lengths are also possible without departing from the scope of the invention. When constructed as a separate assembly, the neck 12 may be coupled to the body 14 via a neck plate 38 (as best shown in FIG. 2) with multiple machine screws 40 that thread into threaded holes 46 in the base 40 of the 3-part hinge assembly 22.

Figure 12:
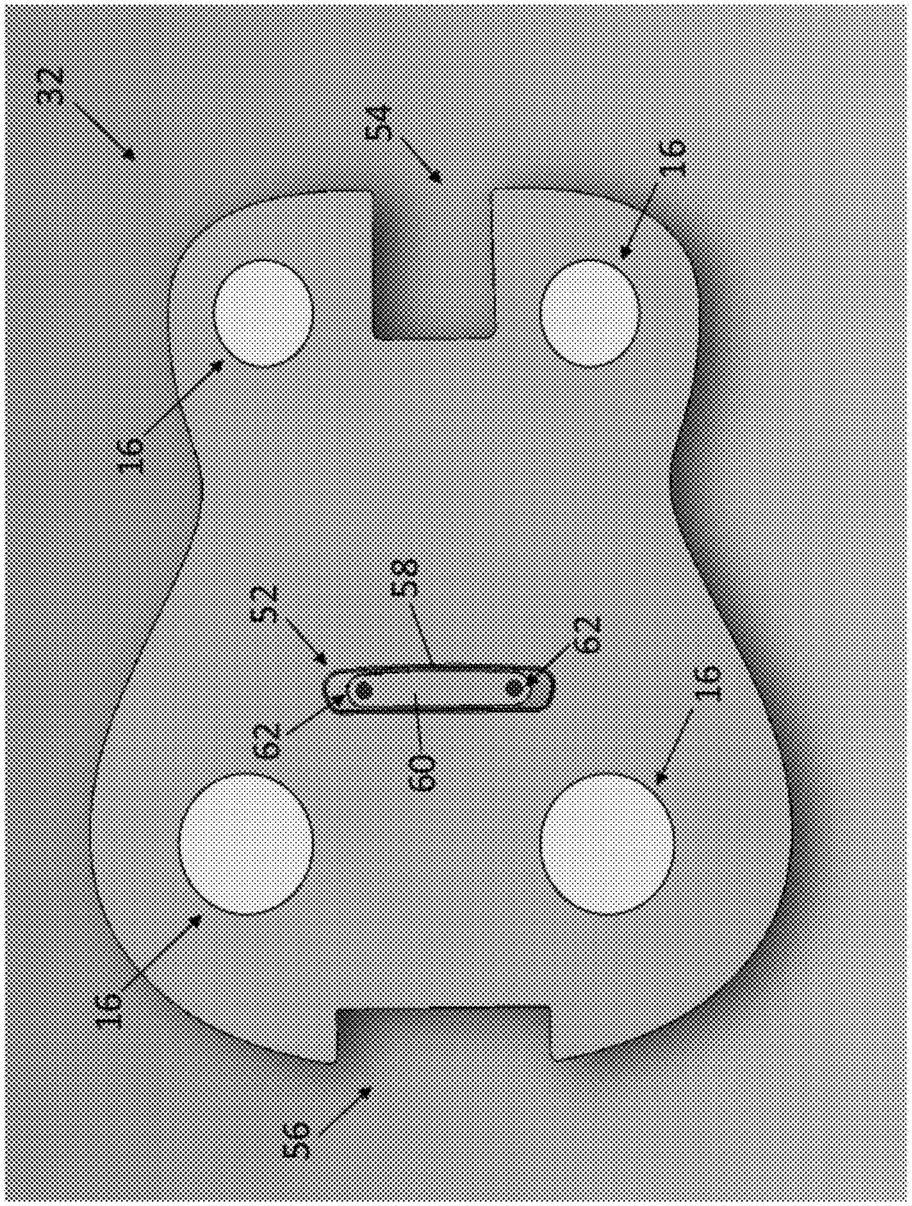
FIGS. 12-14 are top, perspective and back views of a soundboard forming part of the body of the foldable acoustic guitar of FIGS. 1-2 according to a still further aspect of the present invention.
Figure 13:
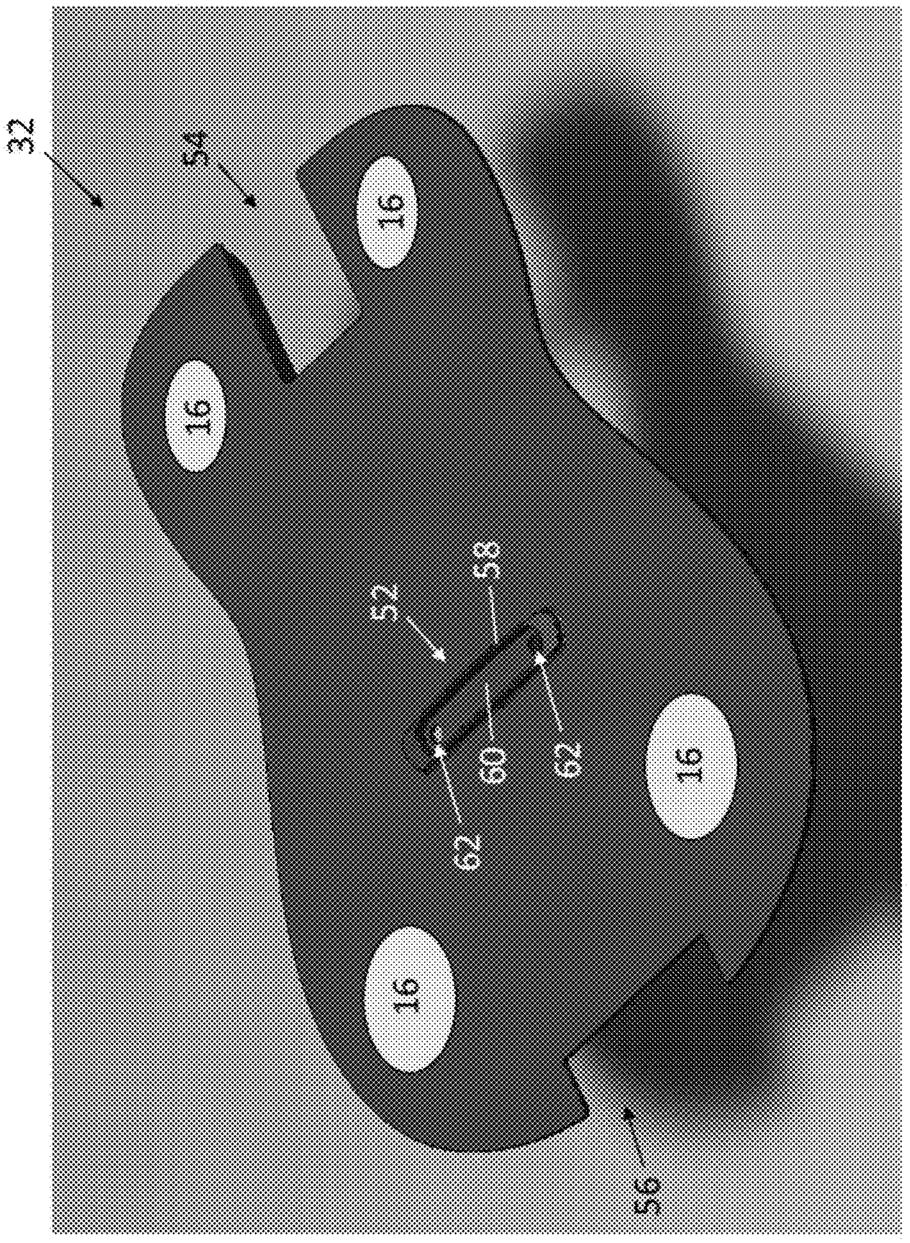
Figure 14:
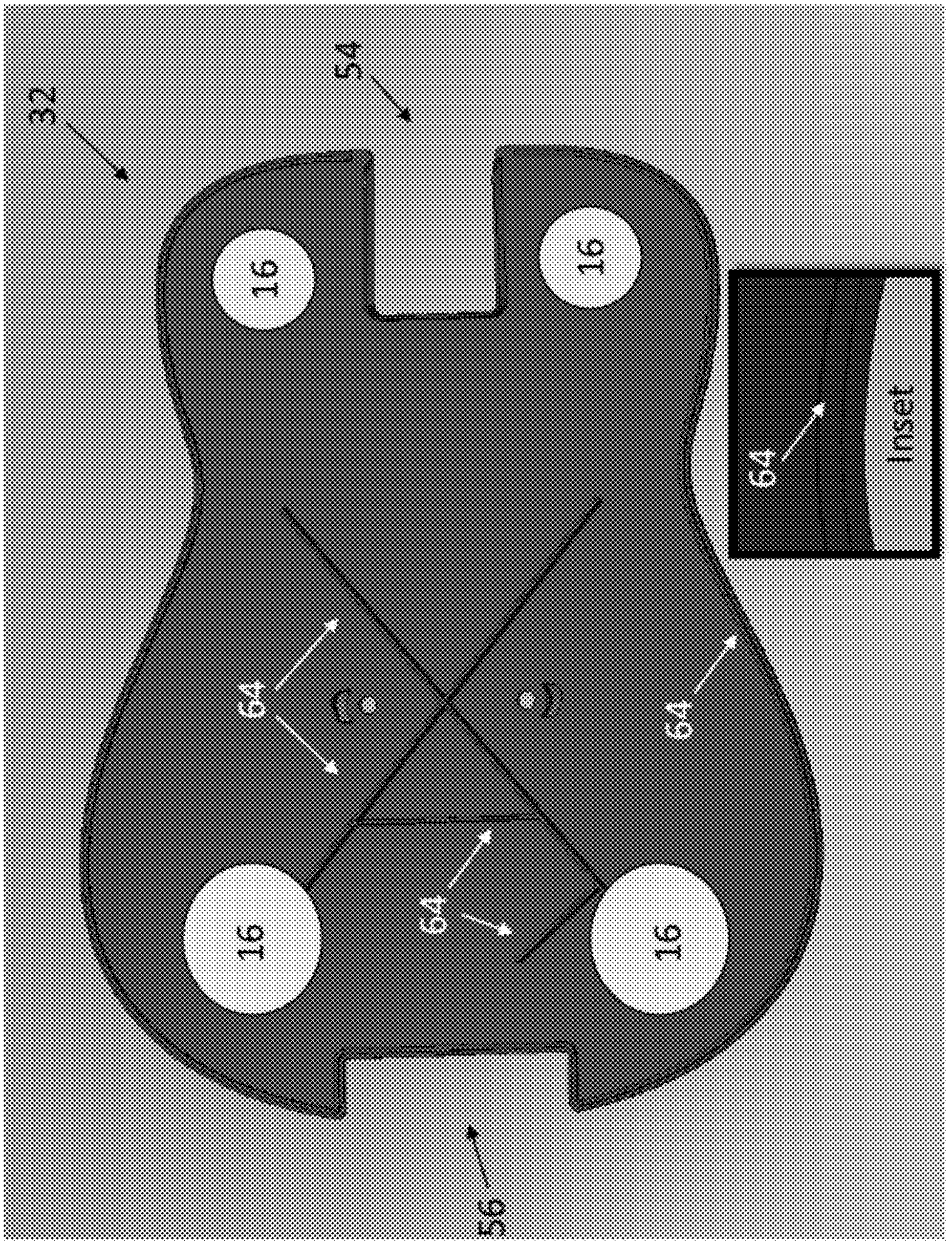

The details of the soundboard 32 are shown in FIGS. 12-14, while those of base 34 are shown in FIGS. 15-18. With initial reference to FIGS. 12-14, the soundboard 32 is generally planar and includes a saddle mount 52 on the upper surface for mounting the saddle 28, a neck cut-out 54 for accommodating the lower neck section 12L of the neck 12, an actuator cut-out 56 for accommodating the actuator 30 which is mounted to the base 34, and one or more sound holes 16. The saddle mount 52 includes a rim 58 extending from the surface of the soundboard that forms a recess 60 dimensioned to receive the saddle 28, and two apertures 62 are formed in the recess 60 to receive the anchor bushings of the saddle 28. On the lower surface, there are a series of braces 64 for modifying the voicing of the soundboard 32, as well as a rim 66 extending about the perimeter of the soundboard 32 to facilitate mounting the soundboard 32 to the base 34. The braces 64 may take any number of varying forms and shapes, and those shown are only set forth by way of example only. The rim 66 is preferably inset from the true perimeter of the soundboard 32 by the same approximate thickness of the side wall of the base 34 (see box with exploded view of rim 66 relative to the true perimeter of the soundboard 32). In so doing, the rim 66 can be easily positioned within the side wall of the base 34 during the assembly process and mounted thereto through the use of adhesives or other securing techniques. The soundboard 32 may be constructed from a variety of suitable materials, including but not limited to artificial materials such as carbon fiber or other polymers/plastics and/or any suitable species of wood, including but not limited to Polonia.

As shown in FIGS. 15-18, the base 34 includes a back 68, a side wall 70 extending upwards from the back 68, and the neck channel 18 extending between a neck recess 72 and the actuator recess 36 formed along the front and back of the sidewall 70, respectively. The neck channel 18 is designed to accommodate the neck 12 in the folded configuration. To do so, it includes an elongated central section 74, an expanded section 76, and a neck mounting section 78. The central section 74 is dimensioned to receive the main section of the neck 12 including upper link 46 of the 3-part hinge 22 while the guitar 10 is in the folded configuration (see FIGS. 4 and 6). The expanded section 76 is dimensioned to receive the headstock 20 and tuners 24 while the guitar 10 is in the folded configuration (see FIGS. 4 and 6).

Figure 2:
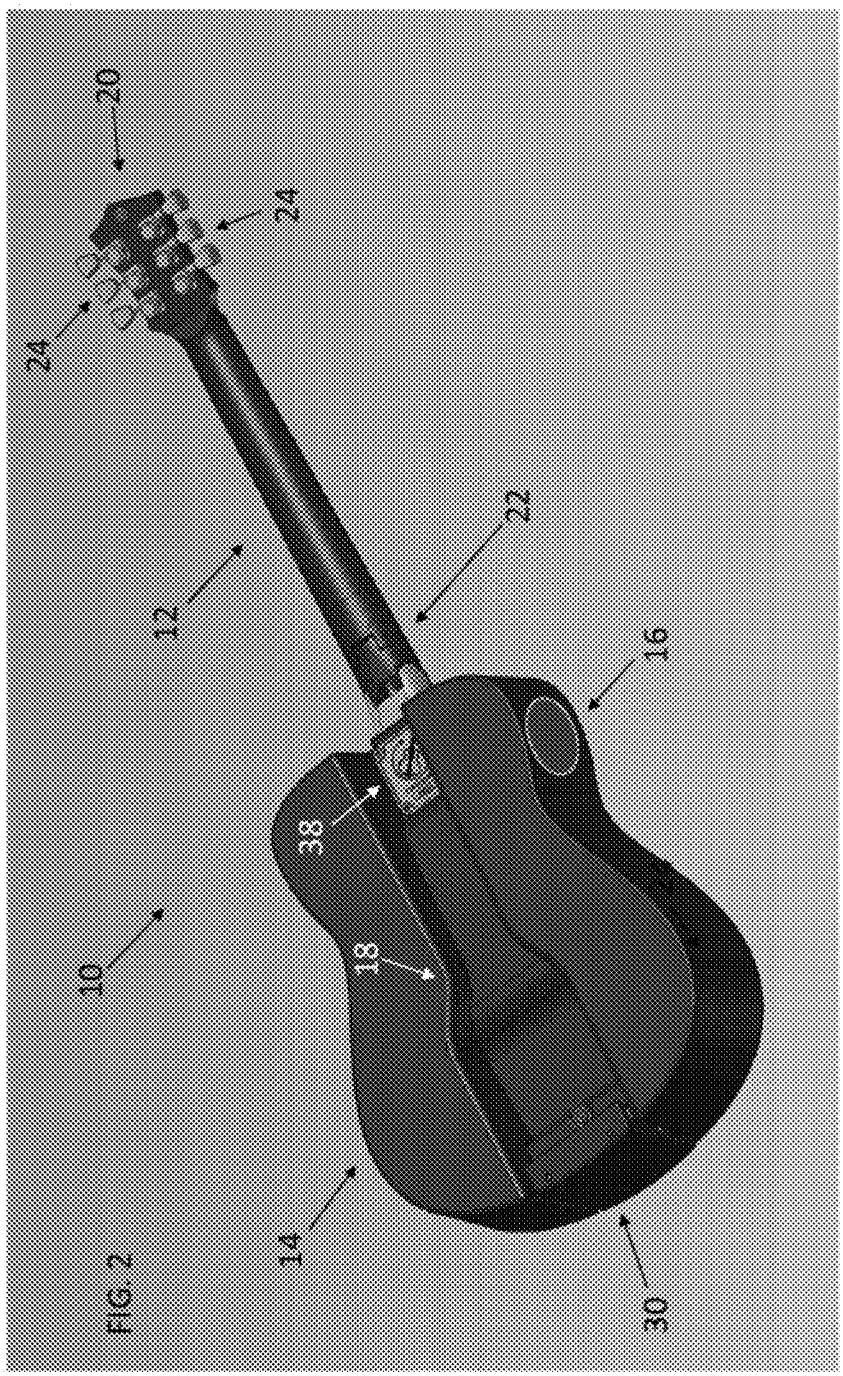
Figure 15:
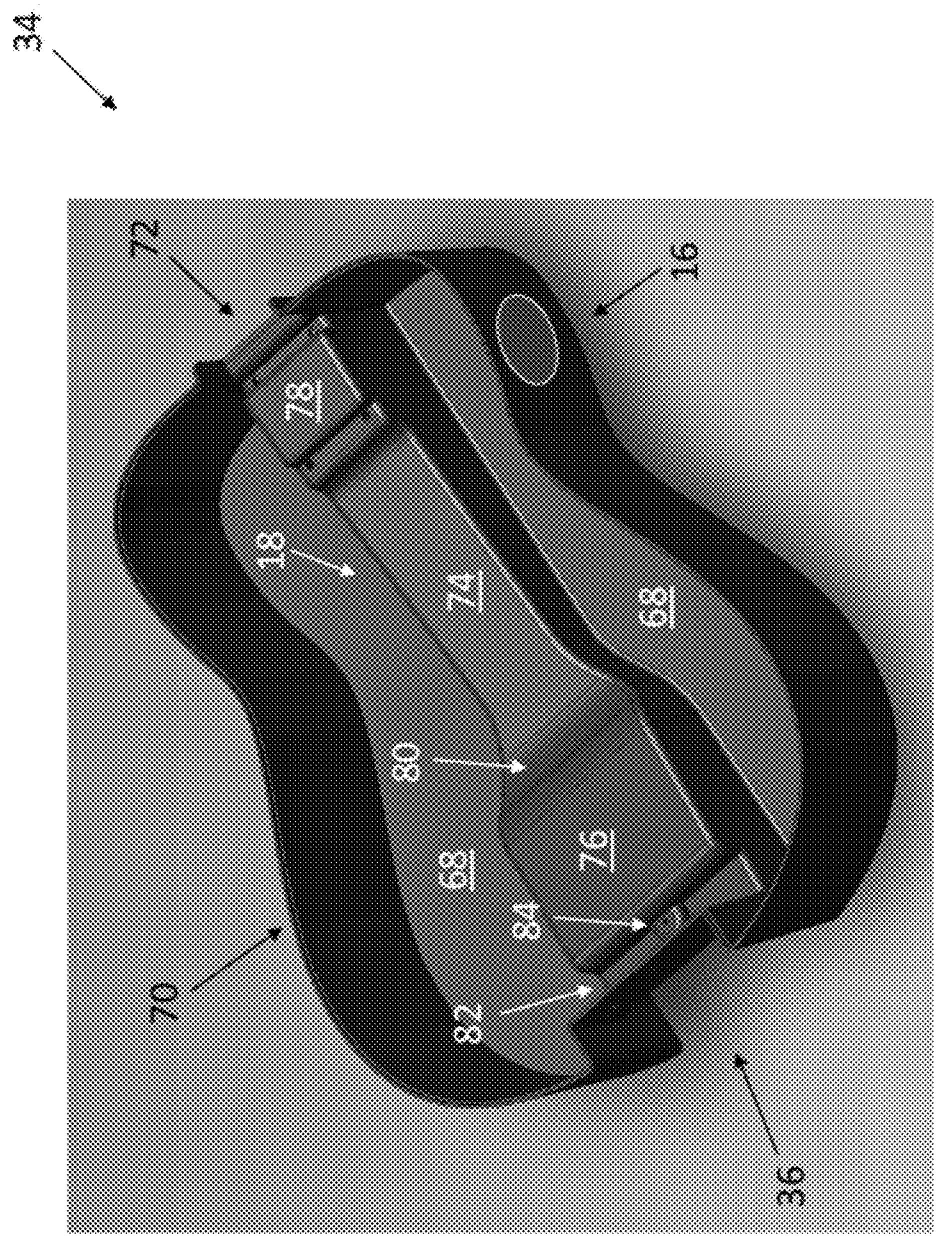
FIGS. 15-18 are a series of views of a base forming part of the foldable acoustic guitar of FIGS. 1-2 according to a still further aspect of the present invention.
Figure 16:
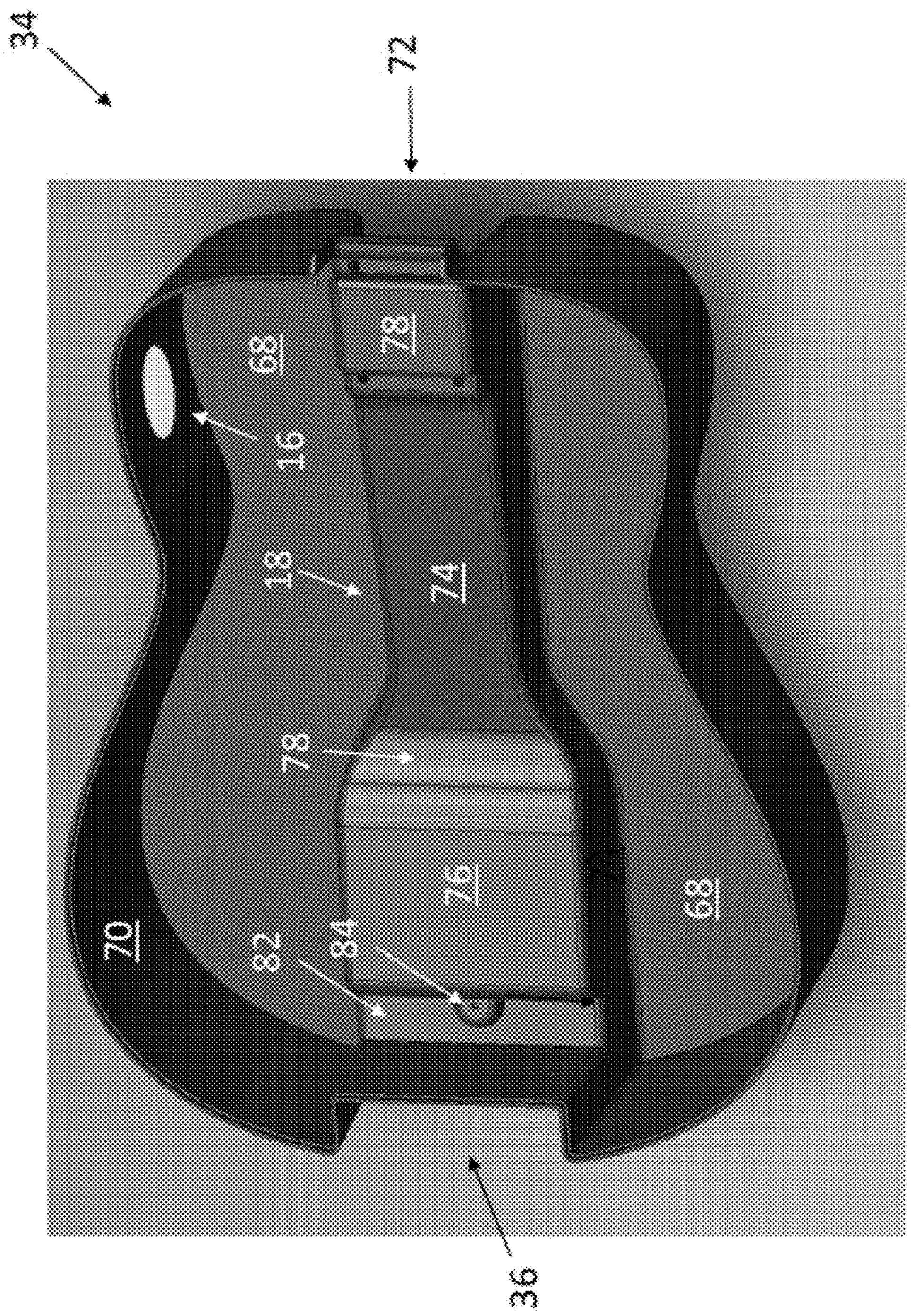
Figure 17:
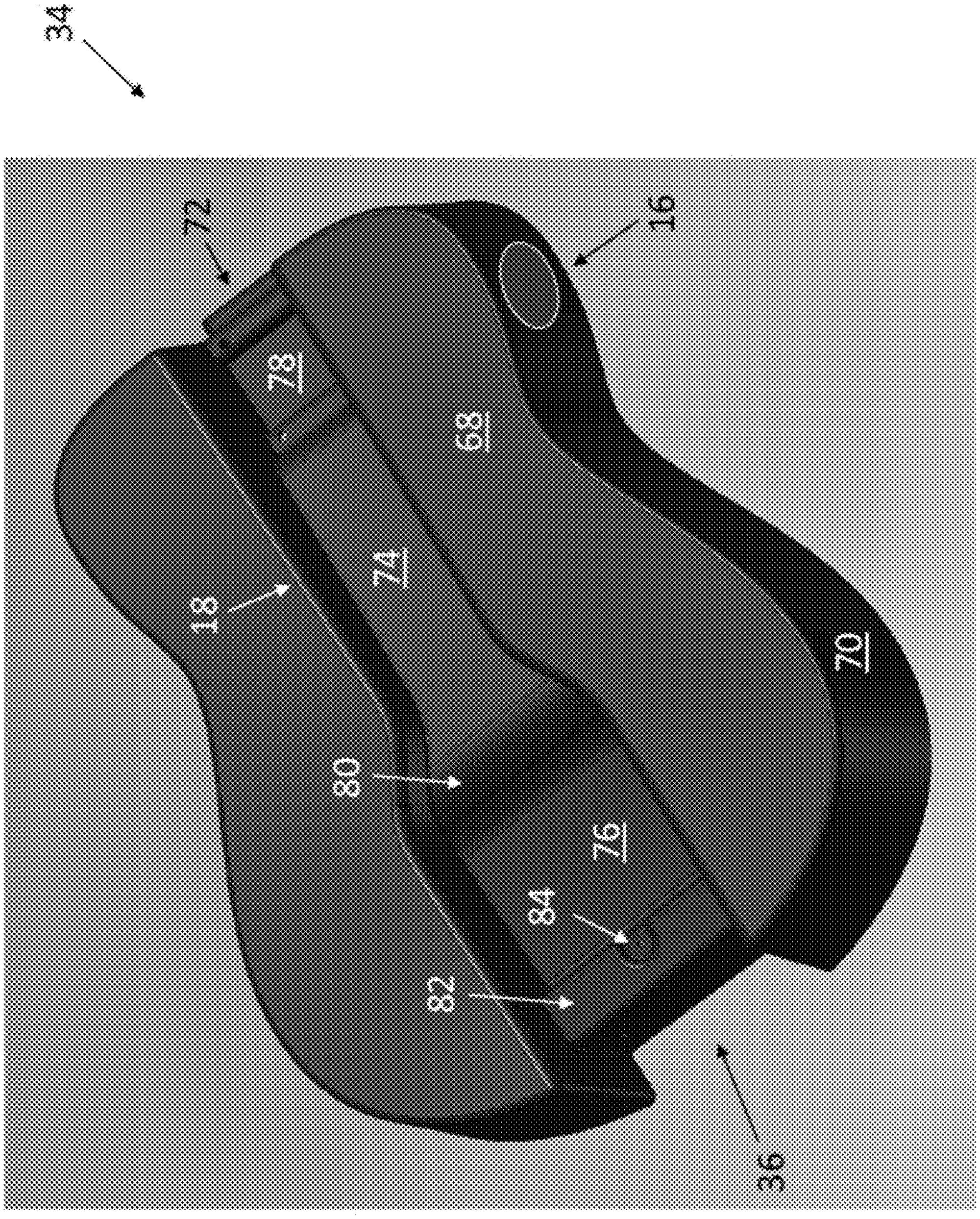
Figure 18:
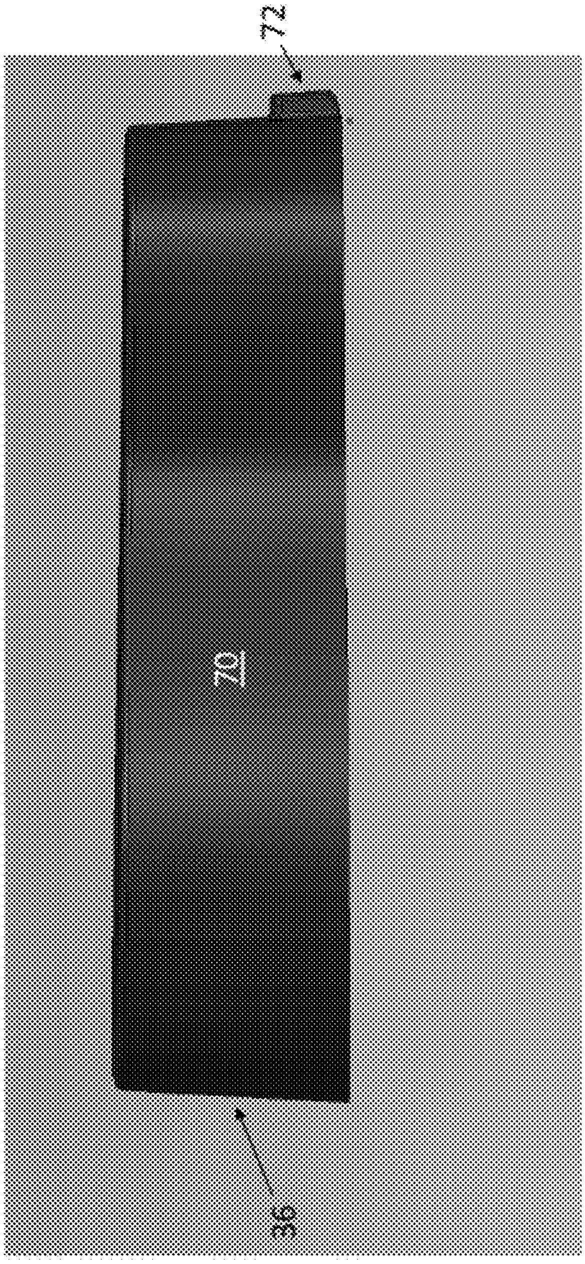

The neck mounting section 78 is dimensioned to accept the base 40 of the 3-part hinge 22 so it can be mounted to the base 34 via the neck plate 38 and threaded machine screws 40 (see FIGS. 2 and 7). More specifically, the neck 12 is mounted to the base 34 by placing the base 40 of the hinge 22 within the neck recess 72 as shown in FIGS. 15-16, placing the neck plate 38 over the neck mounting section 78 as shown in FIG. 17, and thereafter threading the machine screws 80 through the holes in the neck plate 38, through the holes in the neck mounting section 78 of the neck channel 18, and into the threaded holes in the base 40 of the hinge 22. The neck channel 18 also includes a ramped section 80 and a stepped section 82. The ramped section 80 extends between the central section 74 and the expanded section 76 to accommodate the angle of the headstock 20 relative to the main section of the neck 12. The stepped section 82 extends between the expanded section 76 and the actuator recess 36 to accommodate a magnet (not shown) for the purpose of engaging a corresponding magnet housed in the back of the headstock 30 to retain the headstock 20 while in the folded configuration. To do so, the stepped section 82 includes a magnet recess 84 with a hole therein for affixing a magnet (not shown) via a threaded machine screw and nut or other features for securing the magnet (e.g. adhesive).

Figure 19:
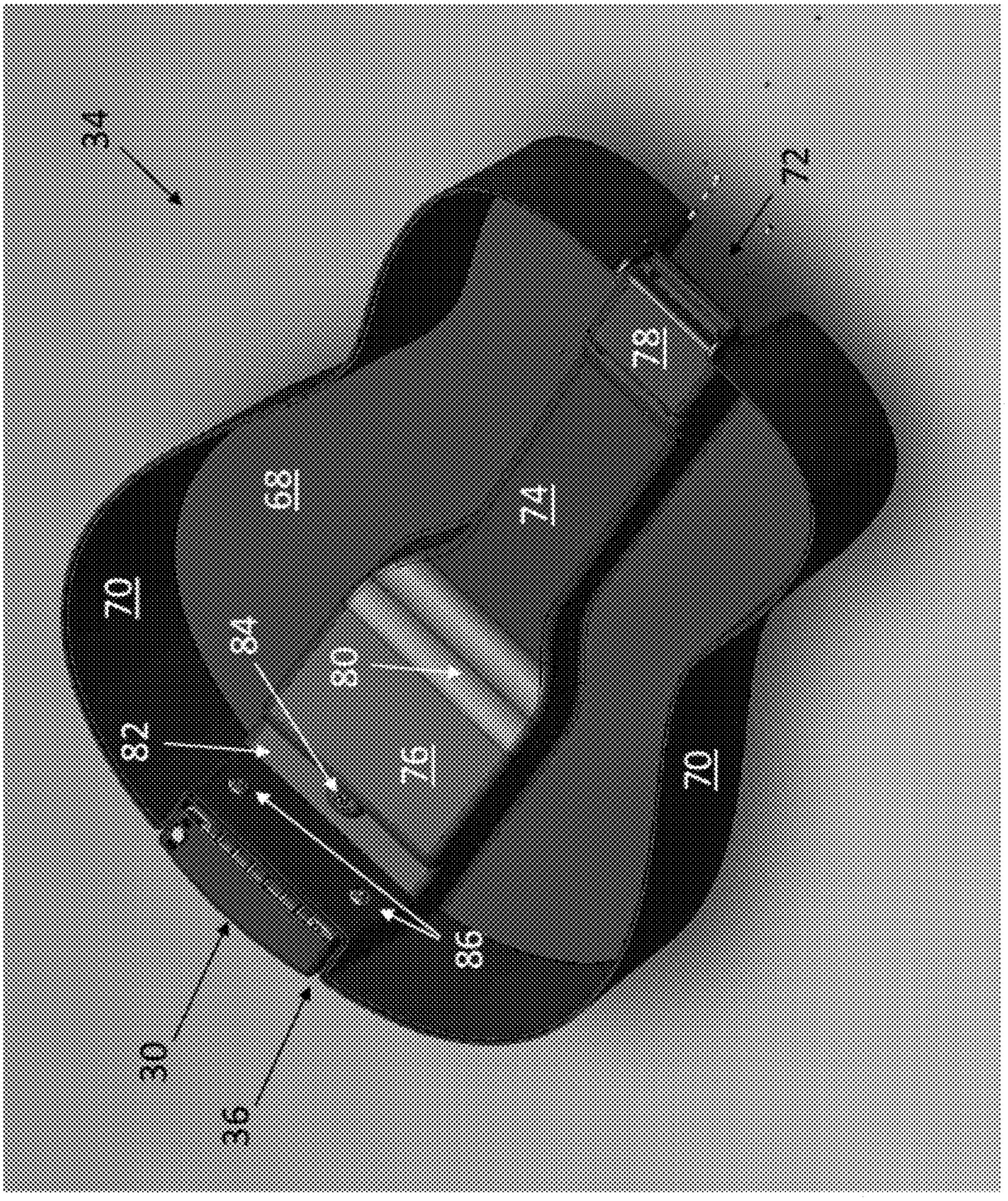
FIGS. 19-20 are perspective and top views of the body base of FIGS. 15-18 with an actuator coupled within an actuator recess formed in the end of the foldable acoustic guitar of FIGS. 1-2 according to a still further aspect of the present invention.
Figure 20:
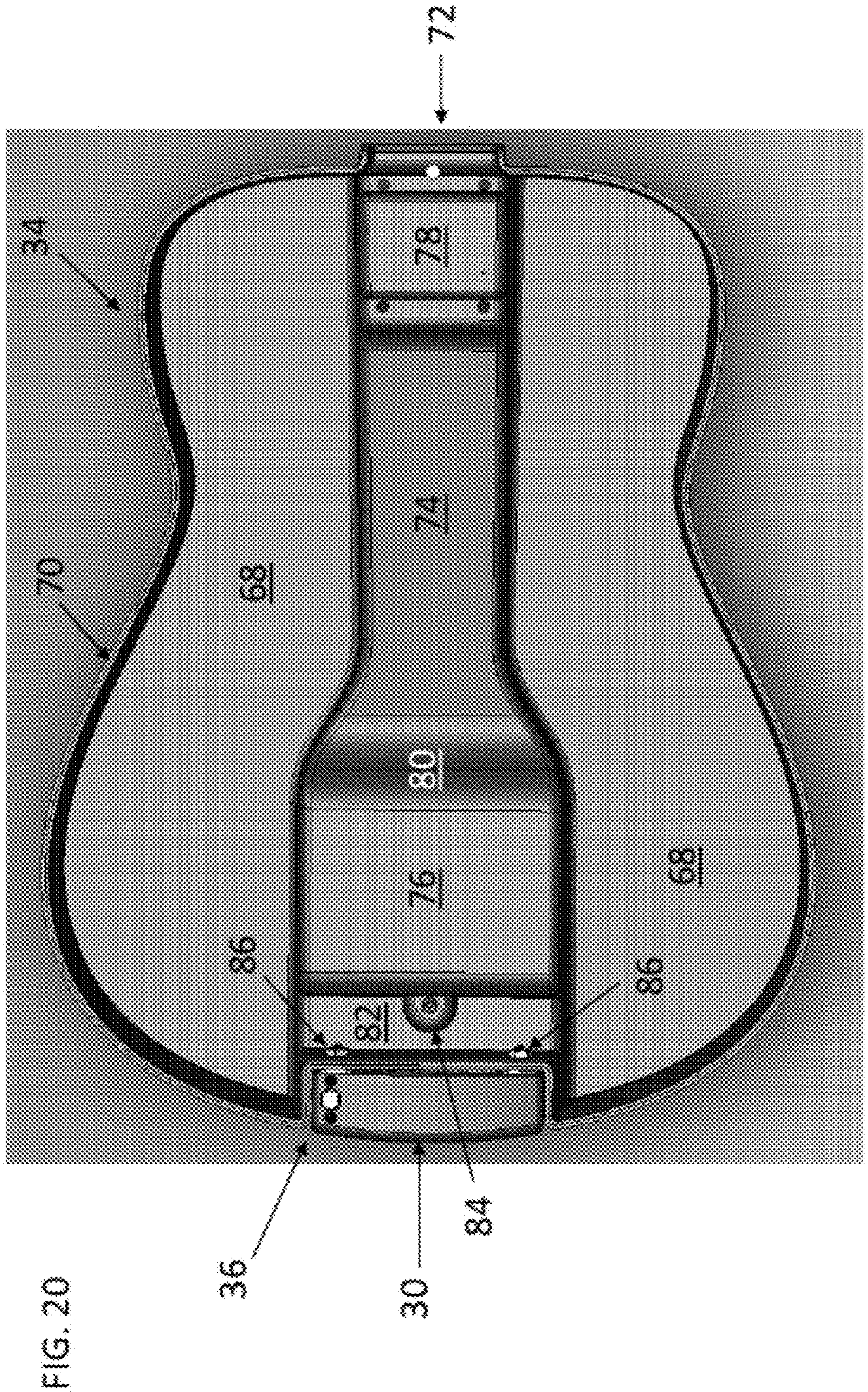
Figure 22:
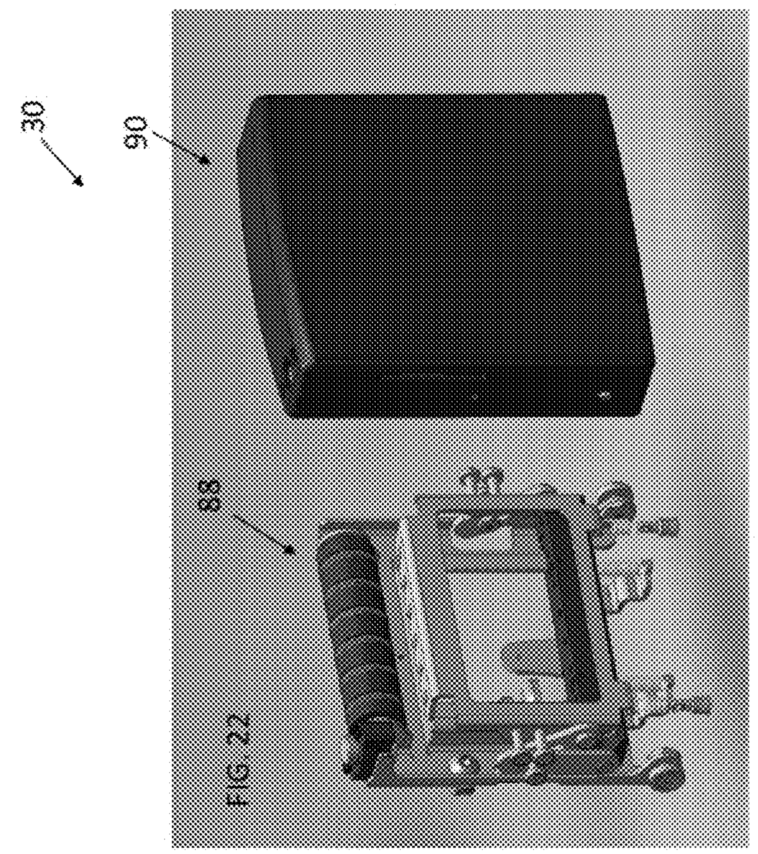
FIGS. 21-22 are perspective views of the actuator illustrating the cover and internal actuator assembly according to aspects of the present invention.
Figure 21:
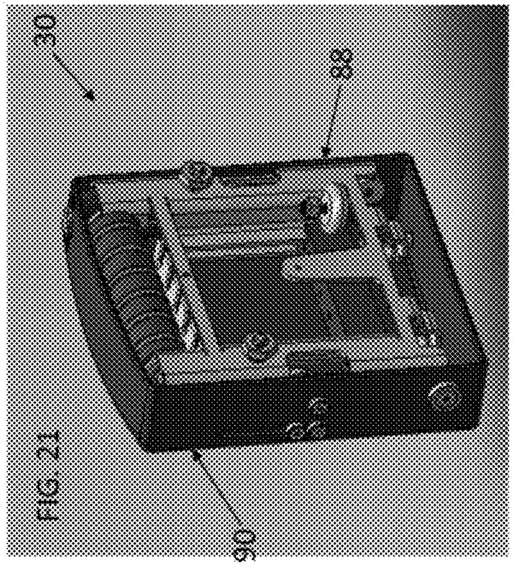
Figure 23:
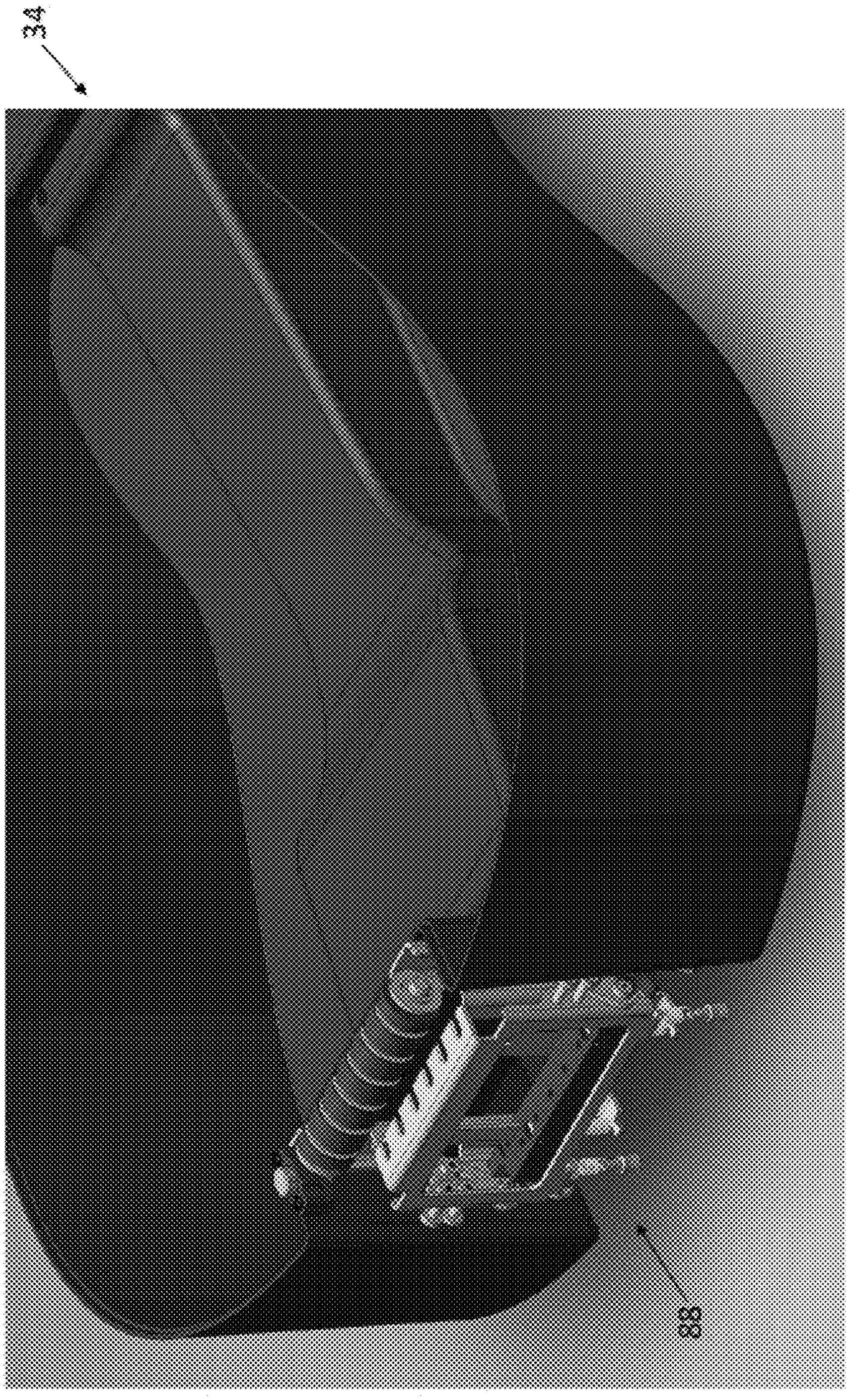
FIGS. 23-24 are perspective and end views of the body base of FIGS. 15-18 with an actuator assembly coupled within an actuator recess formed in the end of the foldable acoustic guitar of FIGS. 1-2 according to other aspects of the present invention.
Figure 24:
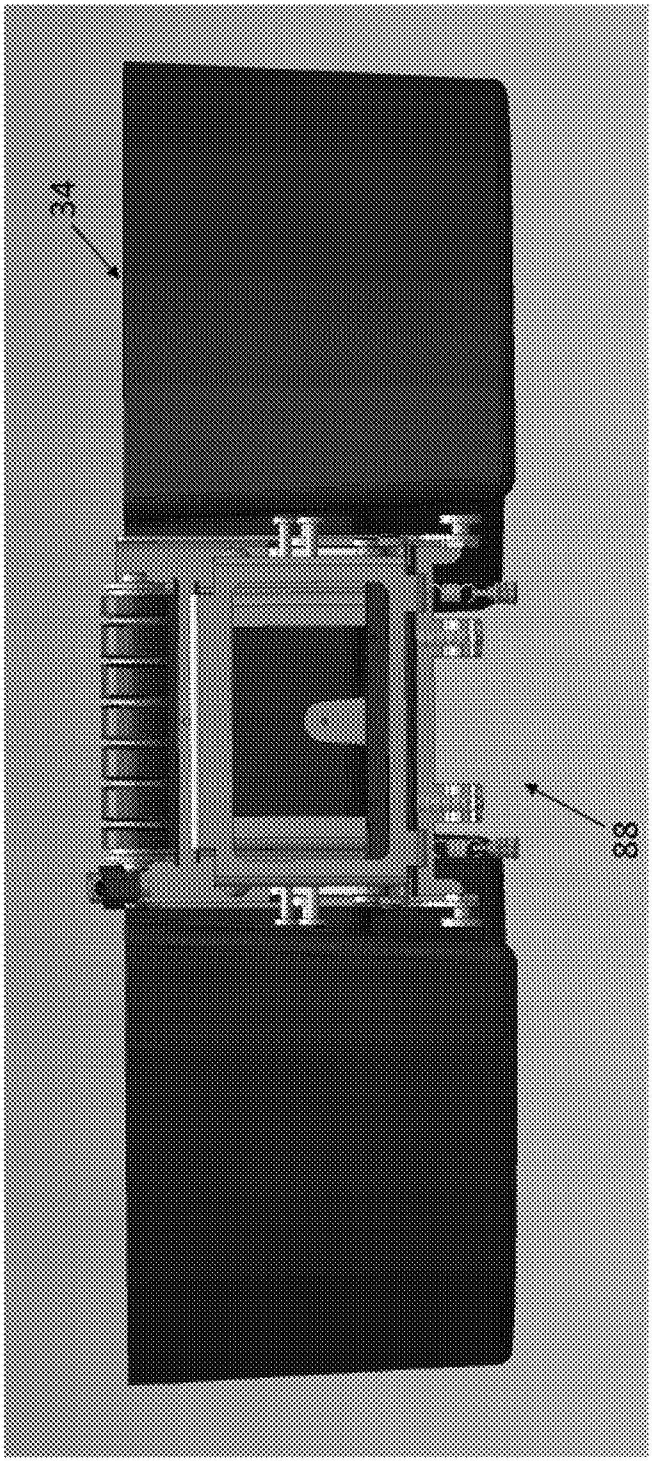

FIGS. 19-33 detail the mounting, construction, and functionality of the actuator 30 according to aspects of the present invention. The actuator 30, as shown in FIGS. 19-20, is dimensioned to be received within the actuator recess 36 of the base 34. The actuator 30 may be mounted within the actuator recess 36 via any number of suitable manners, including (but not limited to) one or more threaded machine screws extending from the mechanism, through corresponding aperture/holes formed in the actuator recess 36, and secured with a plurality of nuts 86 (locking or otherwise) as is known in the art. FIGS. 21-22 illustrate the two primary components of the actuator 30, namely an actuator assembly 88 and a cover 90. The actuator assembly 88 is mounted to the base 34 of the body 14 (see FIGS. 23-24) and the cover 90 is mounted to the actuator assembly 88.

Figure 25:
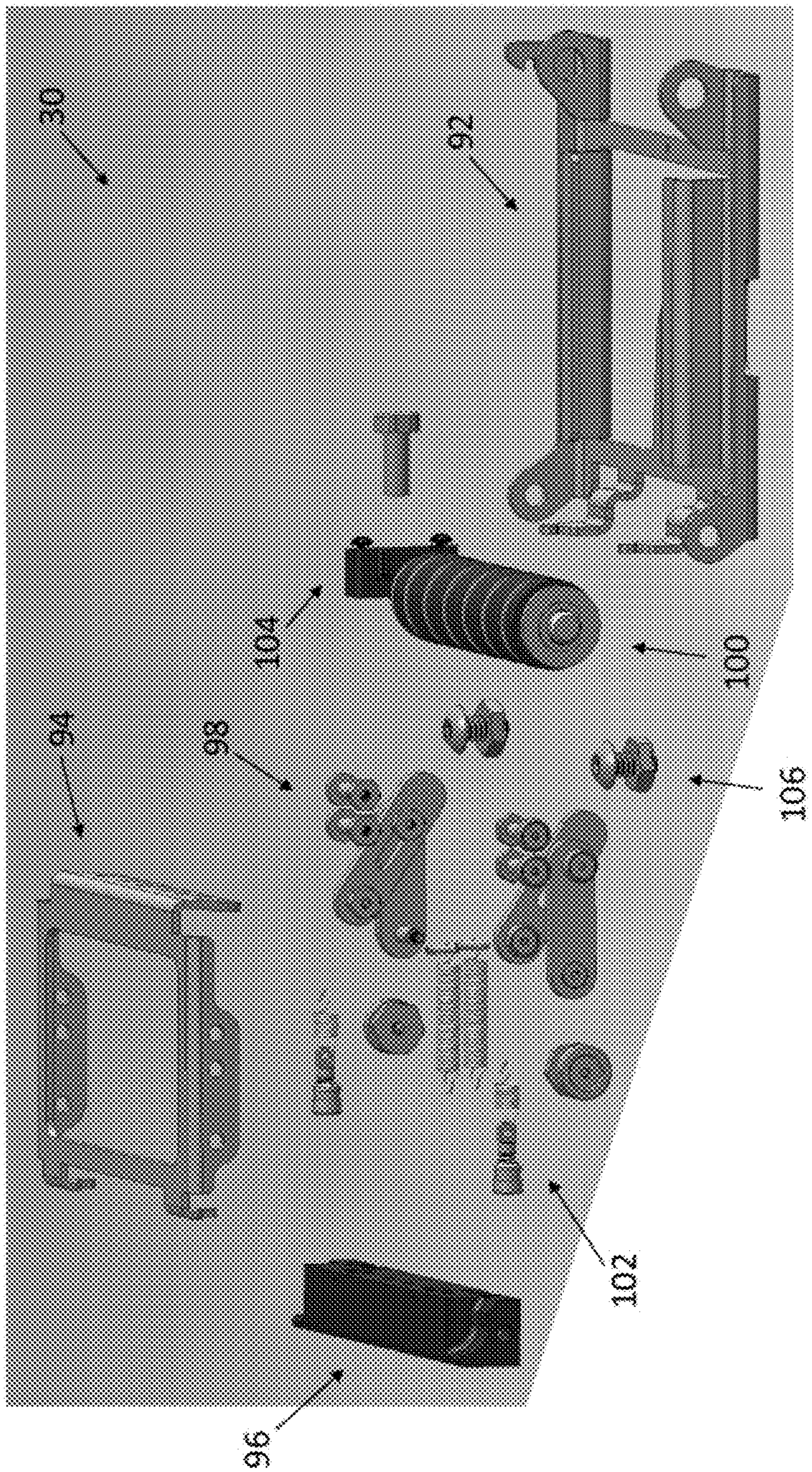
FIG. 25 is an exploded view of the actuator forming part of the foldable acoustic guitar of FIGS. 1-2, illustrating various assemblies and features according to aspects of the present invention.

As shown in FIG. 25, the actuator assembly 88 includes a chassis 92, a handle 94, a tail piece 96, a linkage system 98, a string roller assembly 100, an adjustment system 102, a release system 104, and a mounting system 106 according to one exemplary embodiment. The chassis 92 forms the base or fundamental structure for holding and operating each of the other sub-assemblies forming the actuator assembly 88. The handle 94 is hingedly connected to the chassis 92. The tail piece 96 serves as an anchor for the strings of the foldable acoustic guitar 10 and also translates (moves) along the chassis 92 during the folding and unfolding process. The linkage system 98 enables the hinged interrelation between the chassis 92 and the handle 94 to enable the folding and folding process by loosening and tightening the strings, respectively, when the handle 94 is opened and closed as will be described below. The string roller assembly 100 maintains the strings in alignment during the folding and unfolding process and serves to redirect the strings from the tail piece 96 before they pass onward to the saddle 28 en route to the nut 26 and finally the tuning machines 24. The adjustment system 102 includes a series of springs connected to the tail piece 96 and allows a user or technician to adjust the springs to arrive at a desired string tension. The release system 104 serves to lock and unlock the handle 94 (and cover 90) relative to the chassis 92 to enable the folding and unfolding process. The mounting assembly 106 is for mounting the actuator 30 to within the actuator recess 36 of the base 34 of the body 14, as shown in FIGS. 19-20.

Figure 26:
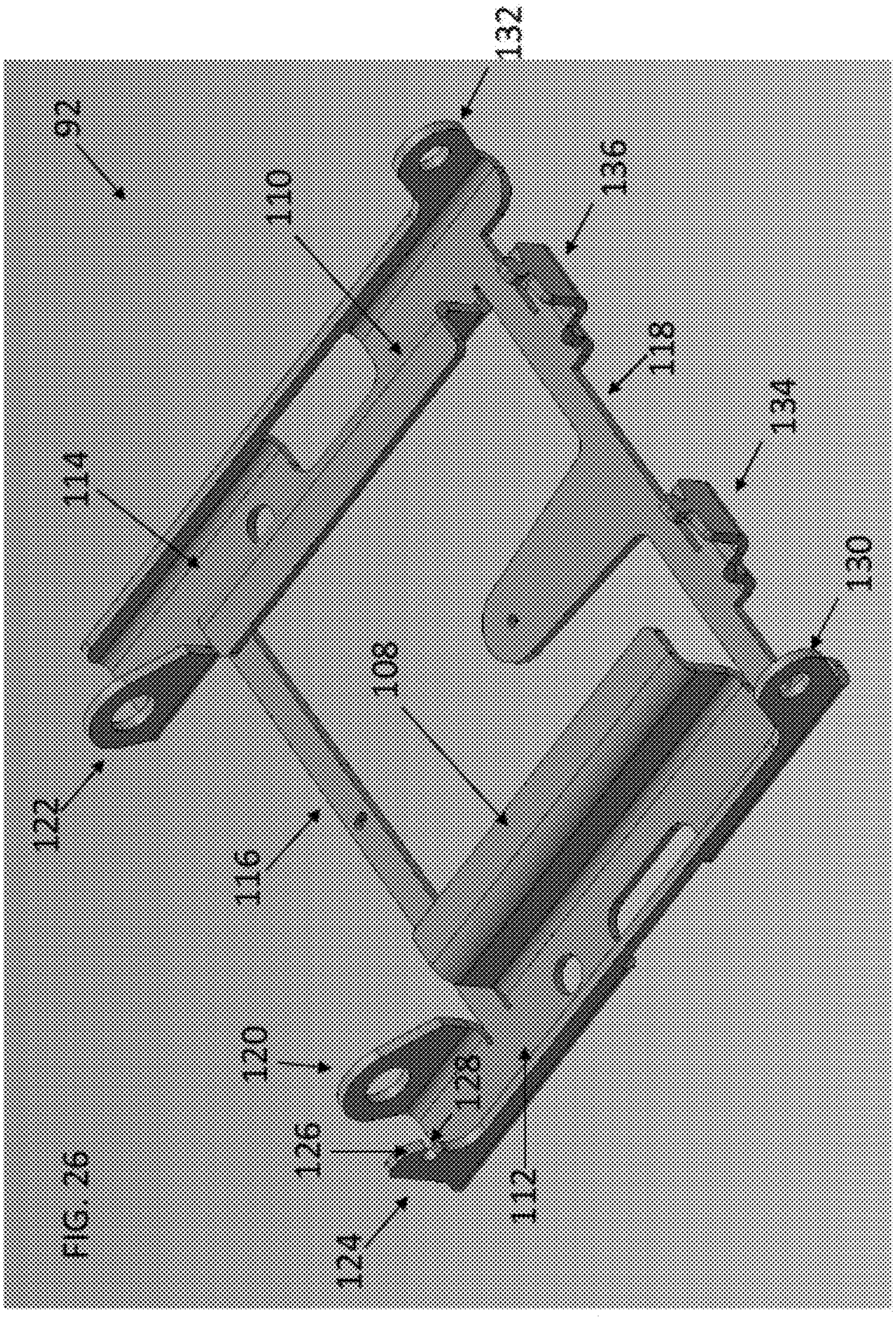
FIGS. 26-27 are perspective and end views of a chassis forming part of the actuator of the foldable acoustic guitar according to aspects of the present invention.
Figure 27:
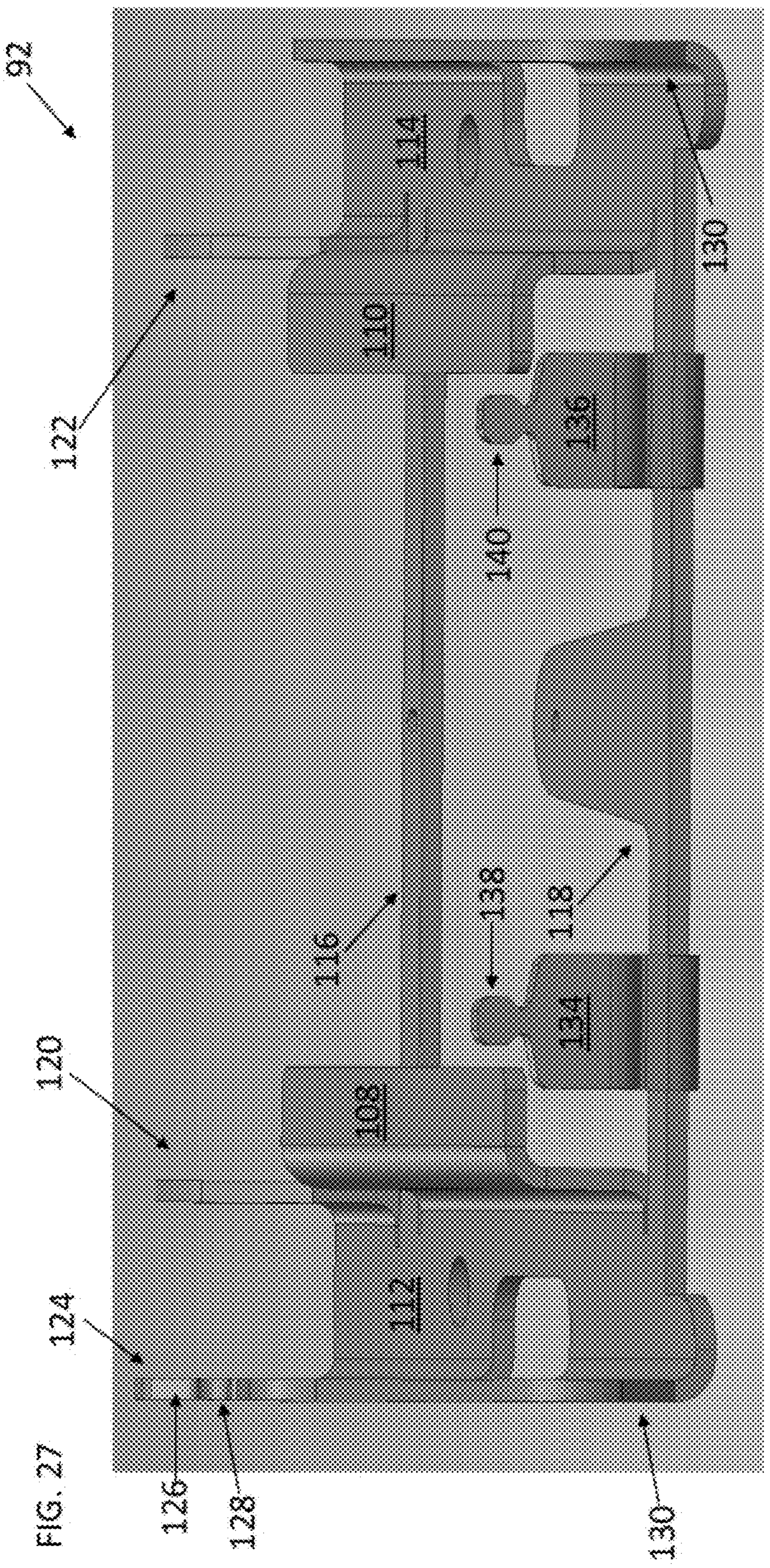

As shown in FIGS. 26-27, the chassis 92 includes left and right rails 108, 110 extending from left and right generally planar base members 112, 114, respectively. Upper and lower cross members 116, 118 extend generally perpendicularly between the left and right base members 112, 114. Left and right shaft tabs 120, 122 extend generally perpendicularly from the left and right base members 112, 114, respectively, with apertures formed therein to hold a shaft of the string roller assembly 100. A release tab 124 extends from the left base member 112 generally adjacent to the left shaft tab 120, which includes a ramped section 126 and a recess 128 for cooperating with the release system 104 for locking and unlocking the handle 94 (and cover 90) relative to the chassis 92 during the folding and unfolding process. Left and right linkage tabs 130, 132 extend generally perpendicularly from the left and right base members 112, 114, respectively, with apertures formed therein to connect the linkage system 98 to the chassis 92. Left and right spring holder tabs 134, 136 extend from lower cross member 118 and each include a terminal end 138, 140 configured to receive thereon a spring coupled to the tail piece 96 to maintain tension on the tail piece 96 during the folding and unfolding process. More specifically, the springs extending between the tail piece 96 and the spring holder tabs 134, 136 have a sufficient spring constant to cause the tail piece 96 to translate (move) along the rails 108, 110 during the folding and unfolding process without damaging the strings. For lighter spring gauges, it may be desirable to remove one of the springs from the terminal ends 138, 140. Conversely, springs with higher spring constants may be used for heavier gauge strings. In one embodiment, the chassis 92 is a contiguous article made from any suitable material, such as stamped or cut sheet metal formed into the series of shapes and features shown in (and described with reference to) FIGS. 26-27.

Figure 28:
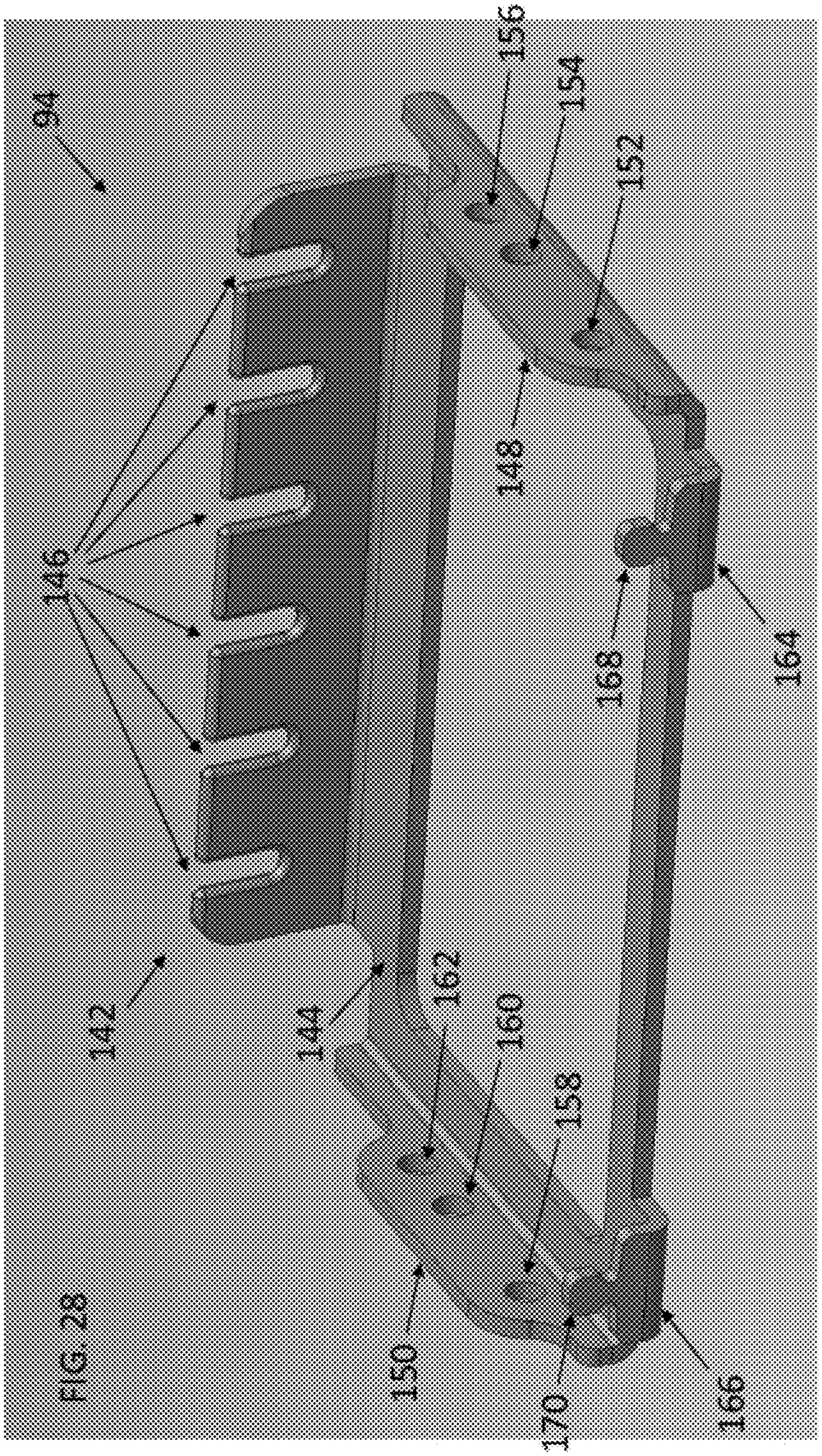
FIG. 28 is a perspective view of a handle forming part of the actuator of the foldable acoustic guitar according to aspects of the present invention.

With reference to FIG. 28, the handle 94 includes a finger purchase section 142 extending generally perpendicularly from a generally planar base 144 with a plurality of string slots 146 formed therein to allow strings to pass from the tail piece 96 to the string roller assembly 100 during operation without interfering with the handle 94. Left and right linkage tabs 148, 150 extend generally perpendicularly from the base 144 and include a plurality of apertures 152, 154, 156 and 158, 160, 162, respectively, for coupling the linkage system 98 to the handle 94 to facilitate movement of the handle 96 and the tail piece 96 during the folding and unfolding process. Left and right spring holder tabs 164, 166 extend from the base 144 and each include a terminal end 168, 170 configured to receive thereon a spring coupled to the adjustment system 102 to vary and select the tension exerted on the handle 94 for the purpose of returning the handle 94 after the tail piece 96 has been moved during the unfolding process to return the strings to full tension for playing.

Figure 29:
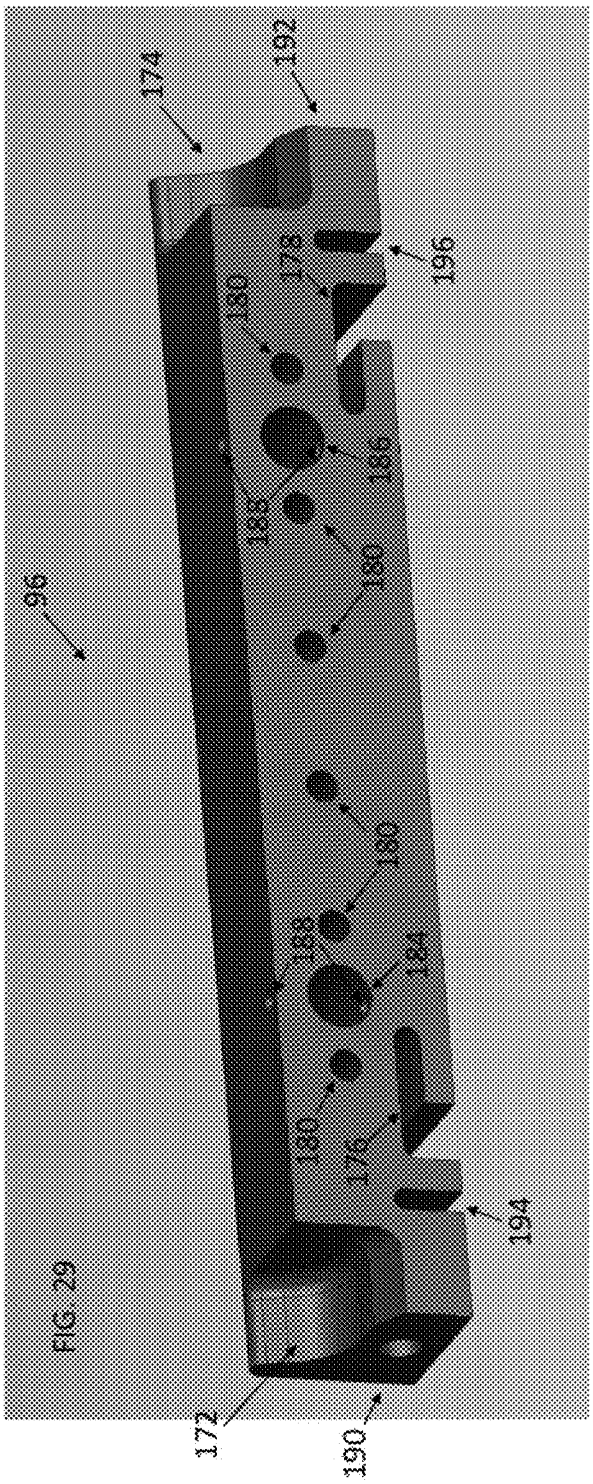
FIGS. 29-30 are perspective and end views of a tail piece forming part of the actuator of the foldable acoustic guitar according to aspects of the present invention.
Figure 30:
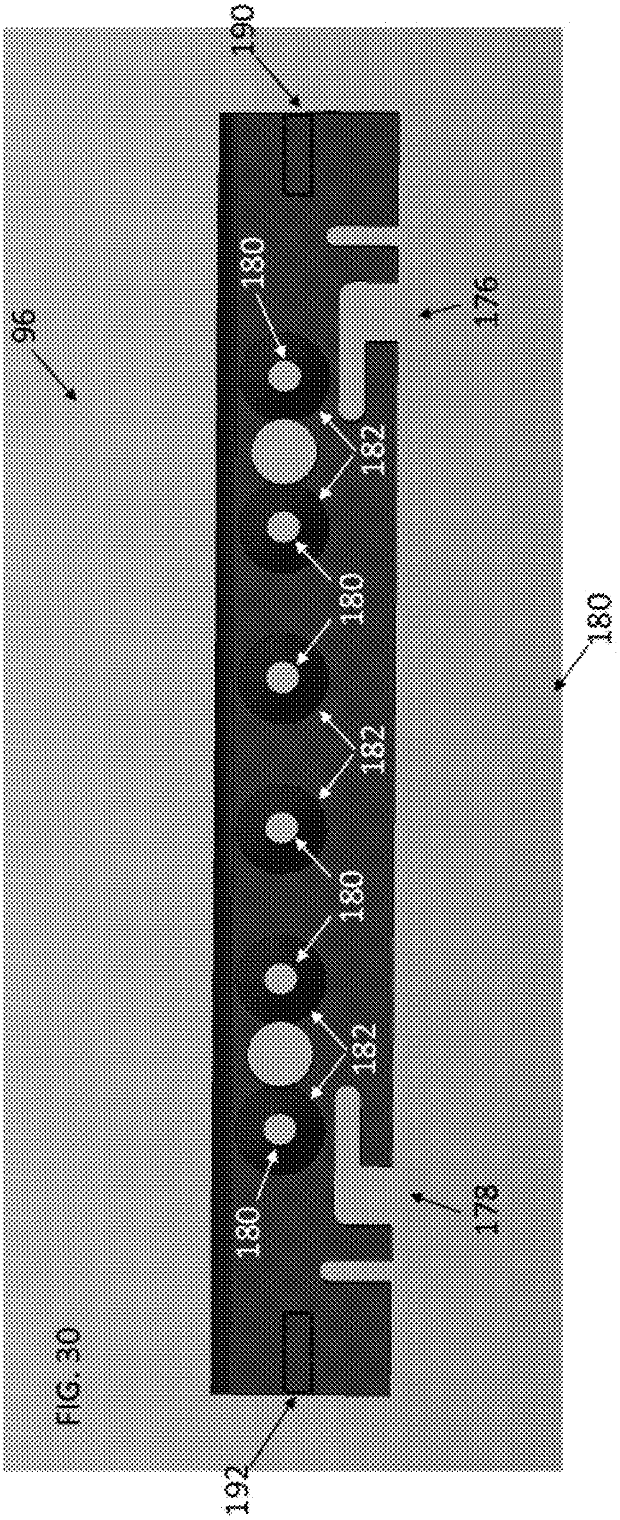

As shown in FIGS. 29-30, the tail piece 96 is generally rectangular with a plurality of features formed therein for the purpose of cooperating with the chassis 92 and the linkage system 98 to enable the translation (movement) of the tail piece 96 during the folding and unfolding process. Left and right curved recesses 172, 174 are formed on the respective ends of the tail piece 96 for cooperating with the linkage system 98 to return the tail piece 96 to retention the strings for play (to approximately 118 lbs. of tension). Left and right rail channels 176, 178 are dimensioned to slideably receive the left and right rails 108, 110, respectively, to enable translation (movement) of the tail piece 96 during the folding and unfolding processes. A plurality of string apertures 180 extend generally parallel to the rail channels 176, 178, with enlarged openings 182 on one end dimensioned to receive the ball-ends of the guitar strings therein, which openings 182 serve as the anchor point for each string on the tail piece 96 before the strings pass through the string apertures 180 and onward over the string roller assembly 100 en route to the saddle 28, nut 26 and tuning machines 24. Left and right spring apertures 184, 186 extend generally parallel to the rail channels 176, 178 and are dimensioned to receive and retain springs (not shown) coupled at their other ends to the left and right spring holder tabs 134, 136. The spring apertures 184, 186 include a pair of pin openings 188 dimensioned to receive retaining pins (not shown) through the ring-end of the spring, which is placed into the spring apertures 184, 186 before the pins are inserted into the pin openings 188 (e.g. via press-fit) to secure the springs to the tail piece 96. Although not shown, the springs serve to maintain a sufficient tension on the tail piece 96 during the folding and unfolding process to ensure proper translation of the tail piece 96 without damaging the strings (e.g. between 1-5 lbs. with a preferred tension of 3 lbs. of string tension). Left and right linkage apertures 190, 192 extend into the lateral edges of the tail piece 96 adjacent to the curved recesses 172, 174 and are dimensioned to receive connecting elements forming part of the linkage system 98. Left and right channels 194, 196 extend generally parallel to the rail channels 176, 178 and are dimensioned to slide over the lower wall sections extending from the left and right linkage tabs 130, 132 of the chassis 92 during the folding and unfolding processes.

Figure 31:
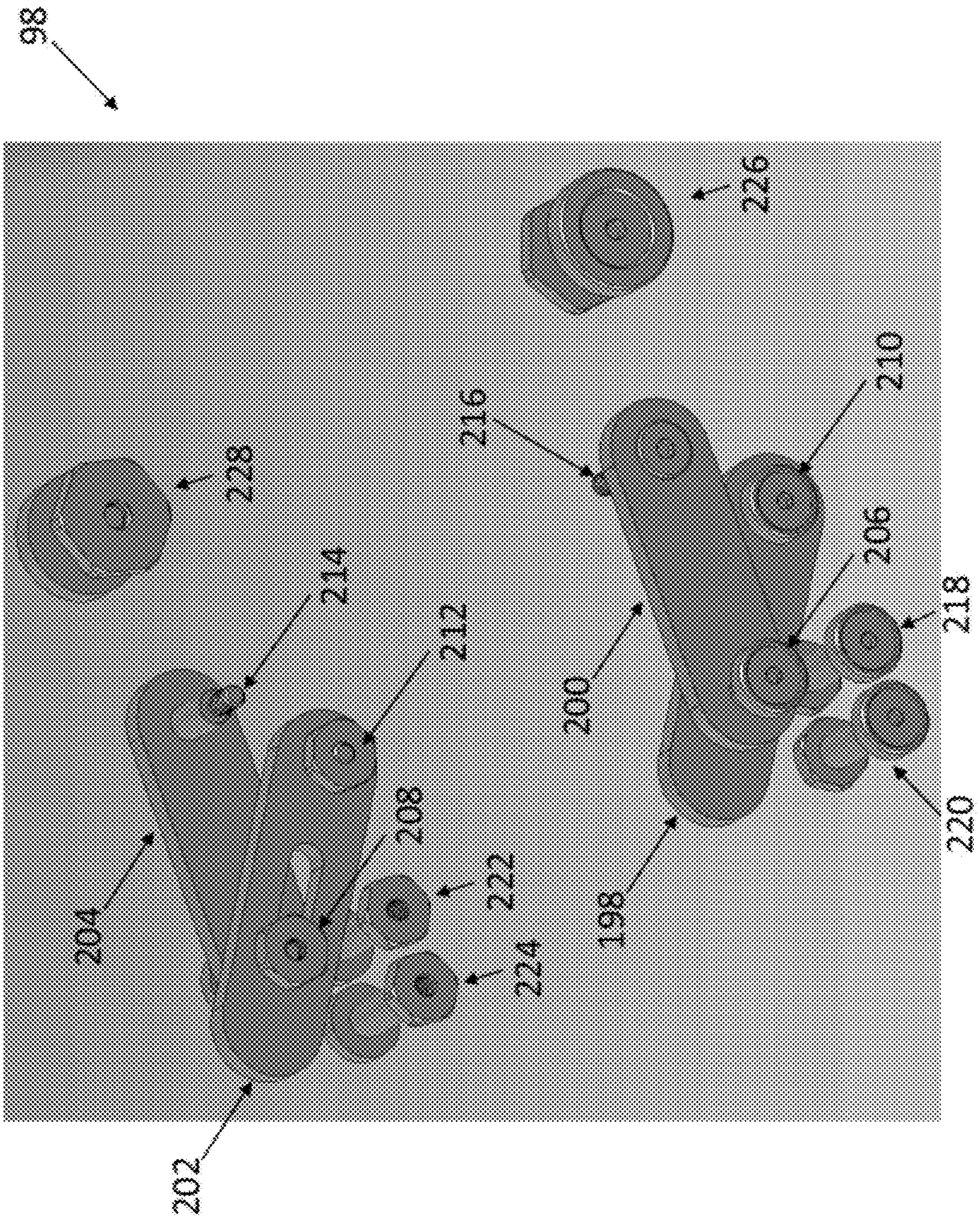
FIG. 31 is a perspective view of a linkage system forming part of the actuator of the foldable acoustic guitar according to aspects of the present invention.

As shown in FIG. 31, the linkage system 98 includes left inner and outer connecting links 198, 200 and right inner and outer connecting links 202, 204. The inner connecting links 198, 202 each include an elongated slot to slideably receive PEM stud and nut assemblies 206, 208, respectively, and an end aperture to rotatably receive PEM stud and nut assemblies 210, 212, respectively. The outer connecting links 200, 204 each include an end aperture to rotatably receive PEM stud and nut assemblies 206, 208, respectively, to rotatably and slideably couple the outer connecting links 200, 204 to the inner connecting links 198, 202, respectively. The outer connecting links 200, 204 also include machine screws 214, 216 to threadably engage the linkage apertures 190, 192 formed in the tail piece 92. PEM stud and nut assemblies 210, 212 are dimensioned to pass through the apertures 152, 158, respectively, of the left and right linkage tabs 148, 150 of the handle 94 to connect handle 94 and the tail piece 96. A pair of left PEM stud and nut assemblies 218, 220 are coupled to the apertures 154, 156 of the left linkage tab 148 of the handle 94 and extend through an elongated slot on the left side of the cover 90 of the actuator 30. A pair of right PEM stud and nut assemblies 222, 224 are coupled to the apertures 160, 162 of the right linkage tab 148 of the handle 94 and extend through an elongated slot on the right side of the cover 90 of the actuator 30. Left and right PEM stud and nut assemblies 224, 226 extend through the linkage tabs 130, 132 of the chassis 92 and through apertures formed in the left and right side of the cover 90 of the actuator 30.

Figure 32:
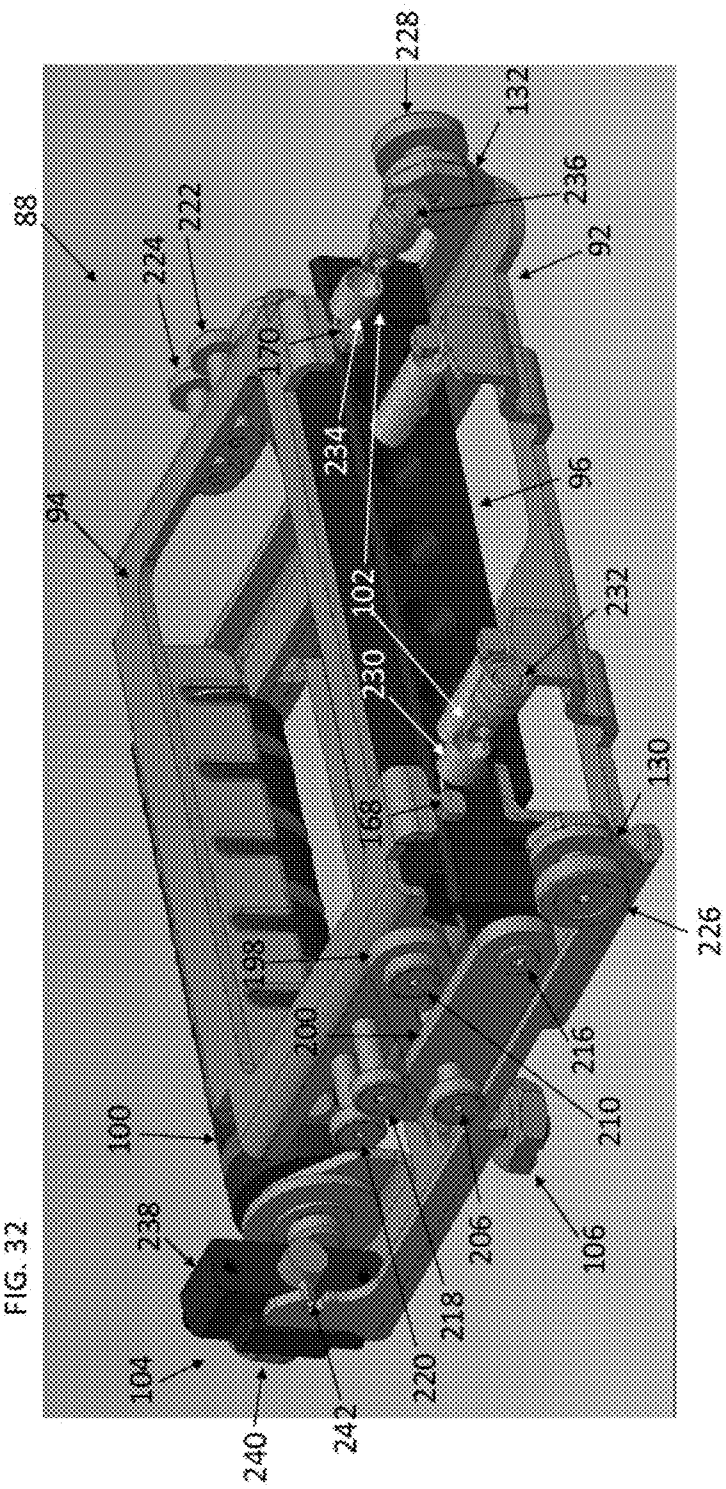
FIGS. 32-33 are perspective (left and right) views of the actuator assembly forming part of the actuator of the foldable acoustic guitar in the closed and open configurations, respectively, according to aspects of the present invention.
Figure 33:
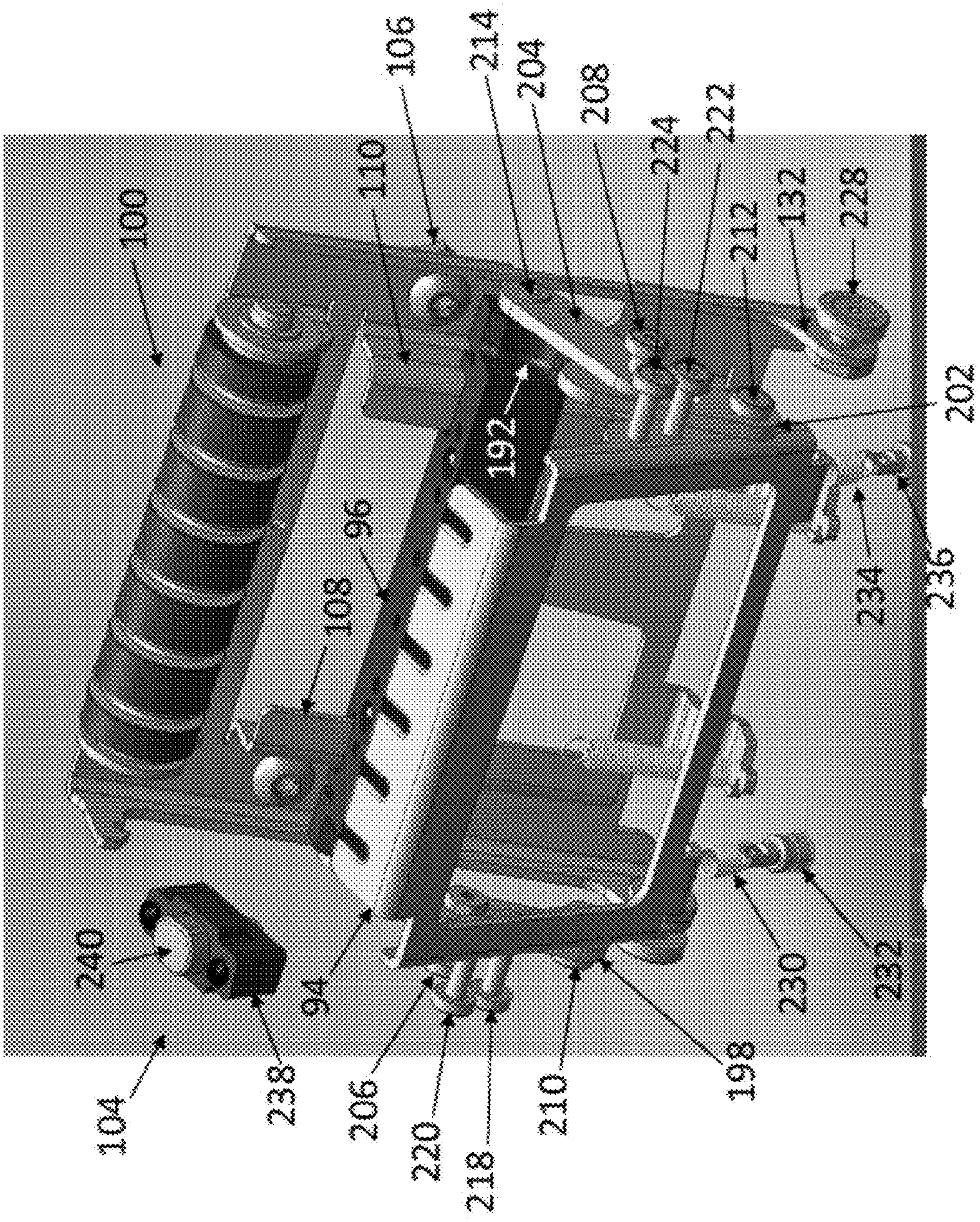
Figure 34:
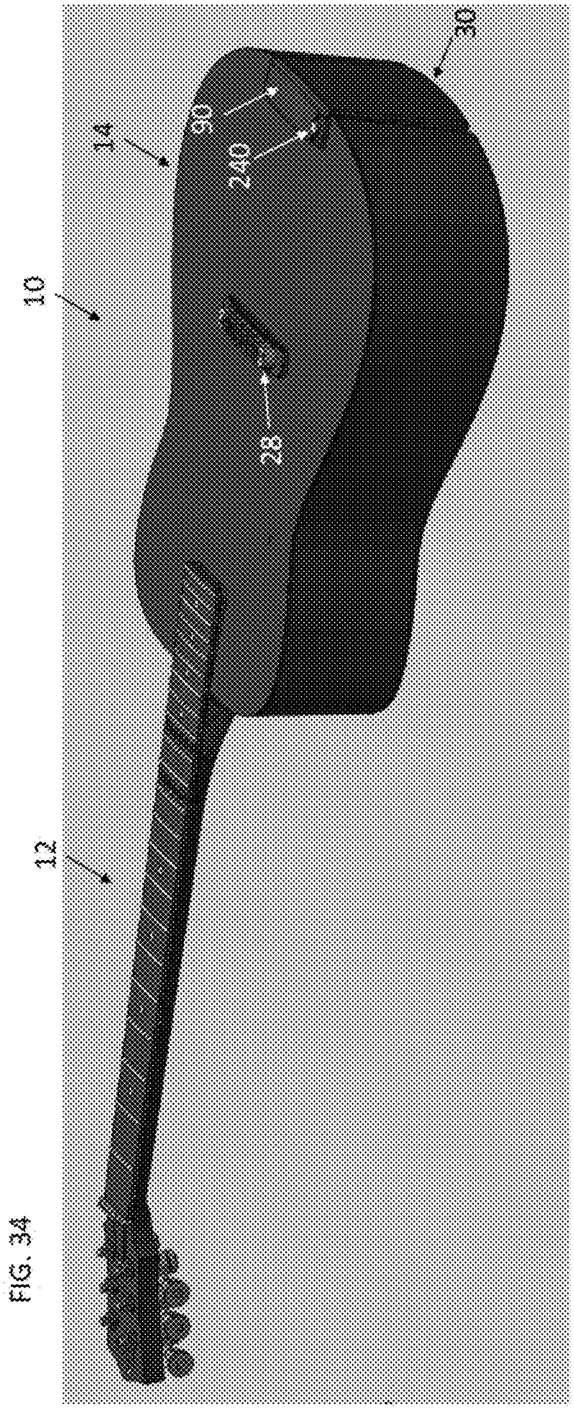
FIGS. 34-35 are perspective and partial sectional side views of the foldable acoustic guitar of FIGS. 1-2 illustrating the guitar in the playing position with the actuator assembly locked for play according to aspects of the present invention.

As shown in FIGS. 32-33 (with the actuator 88 in the closed and open configurations, respectively), the adjustment system 102 includes a left spring 230 mounted at one end to the terminal 168 of the handle 94 and at the other end to adjustment collet 232, which is mounted within an aperture formed at the bottom of the cover 90 of the actuator 30. The adjustment system 102 includes, in similar fashion, a right spring 234 mounted at one end to the terminal 170 of the handle 94 and at the other end to adjustment collet 236, which is mounted within an aperture formed at the bottom of the cover 90 of the actuator 30. The release system 104 includes a housing 238 mounted on the inside top of the cover 90, along with a release button 240 extending through an aperture formed in the housing 238. The release button 240 is positioned such that the top surface can be manually depressed or pushed downward by a user to disengage or release the cover 90 (and with, that handle 94 and tail piece 96) from a locked position relative to the chassis 92. To do so, the lower part of the release button 240 is equipped with a laterally extending locking pin 242 that is dimensioned to rest within the recess 128 of the release tab 124 of the chassis 92. When the release button 240 is pushed in, the locking pin 242 is forced past a lip formed on the edge of the recess 128 to thereby release the cover 90 from the locked position. When the cover 90 is moved back to the locked position, the locking pin 242 will contact the ramped section 126 of the release tab 124 to facilitate the return of the locking pin 242 into the recess 128.

Figure 35:
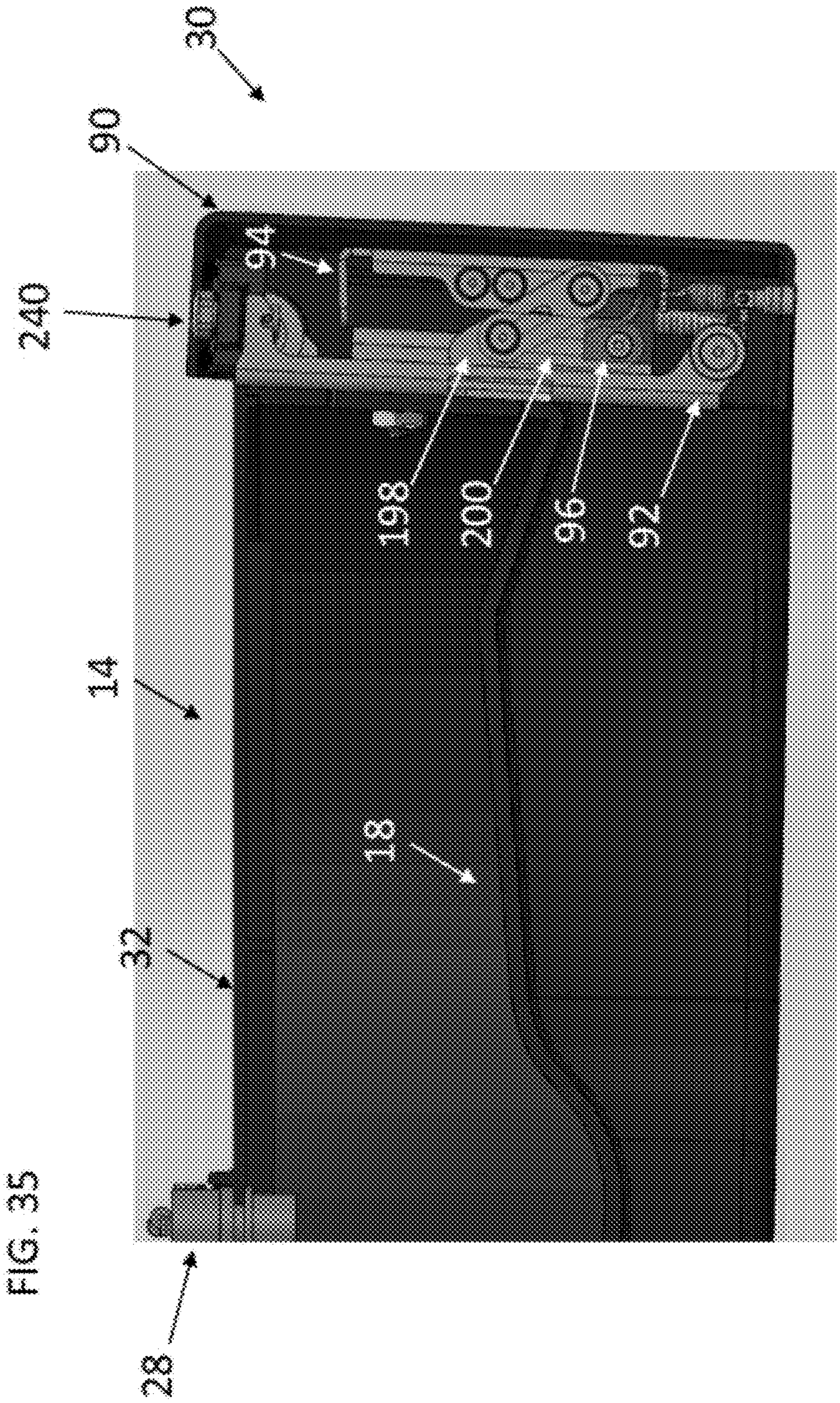
Figure 36:
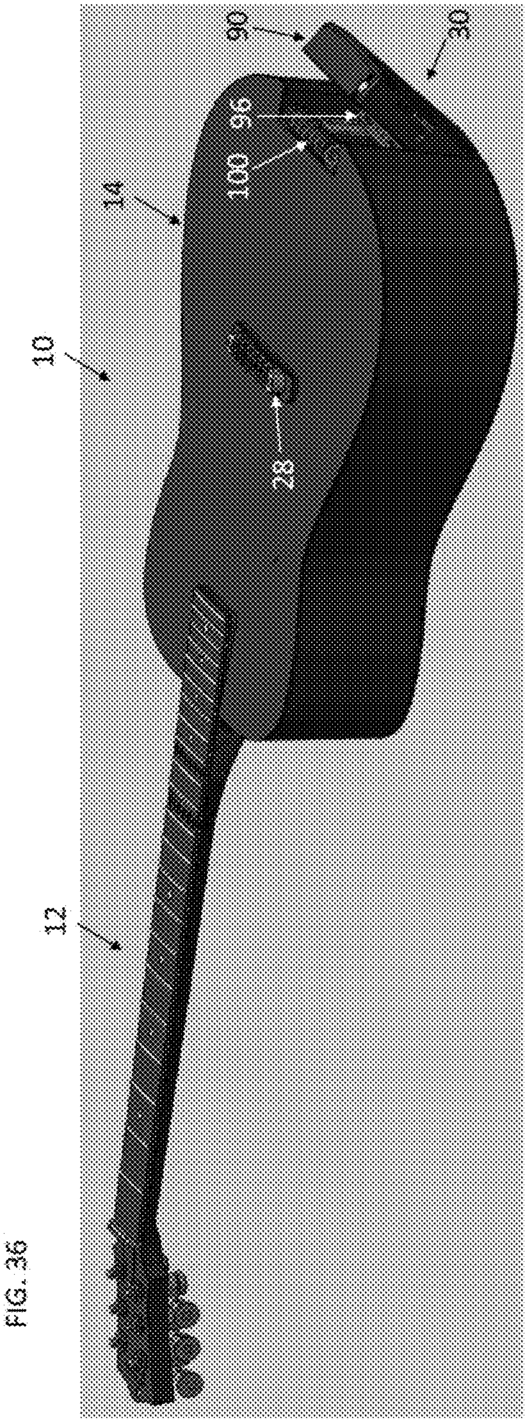
FIGS. 36-37 are perspective and partial sectional side views of the foldable acoustic guitar of FIGS. 1-2 illustrating a step in the folding process, namely an initial step of opening the actuator according to aspects of the present invention.
Figure 37:
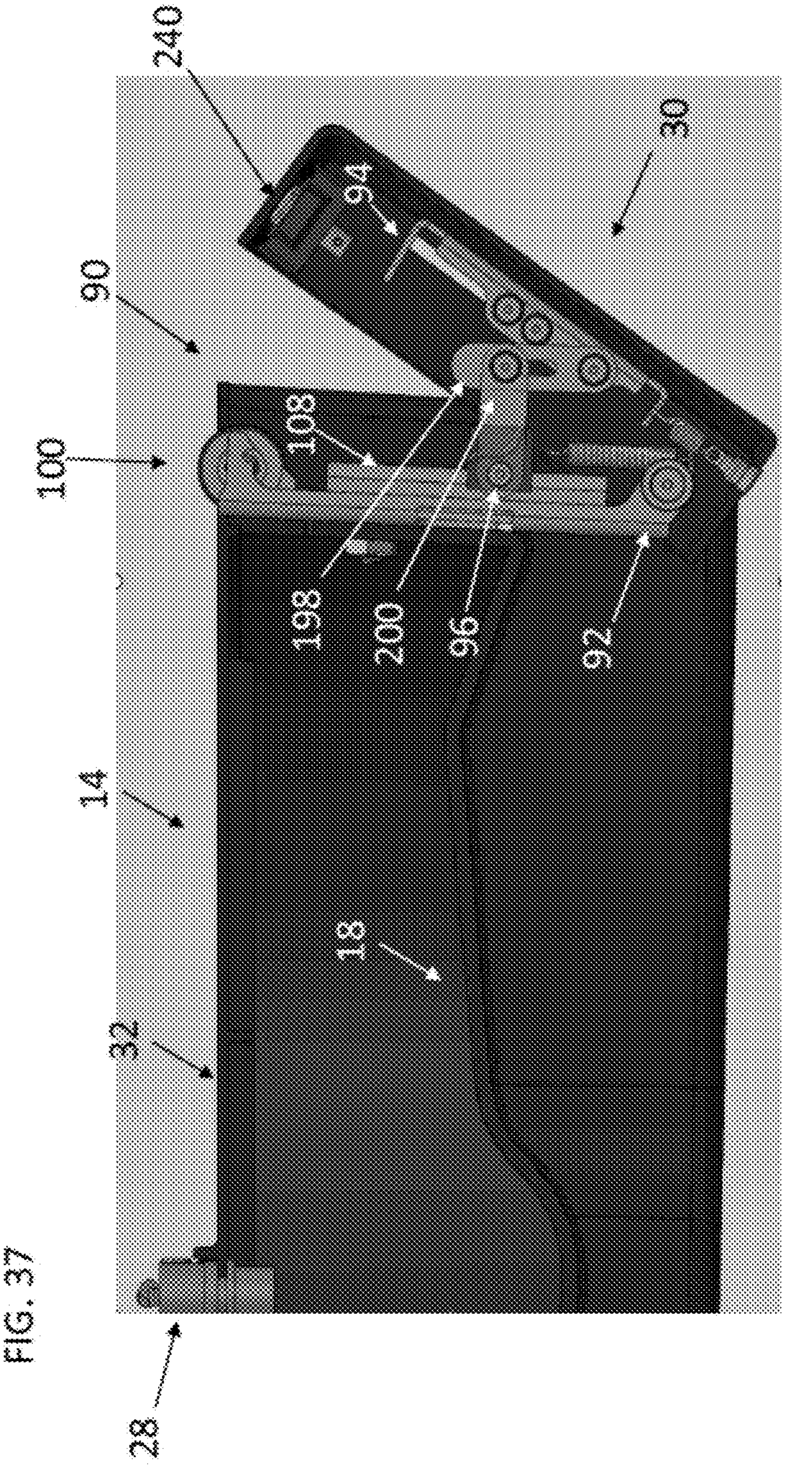
Figure 38:
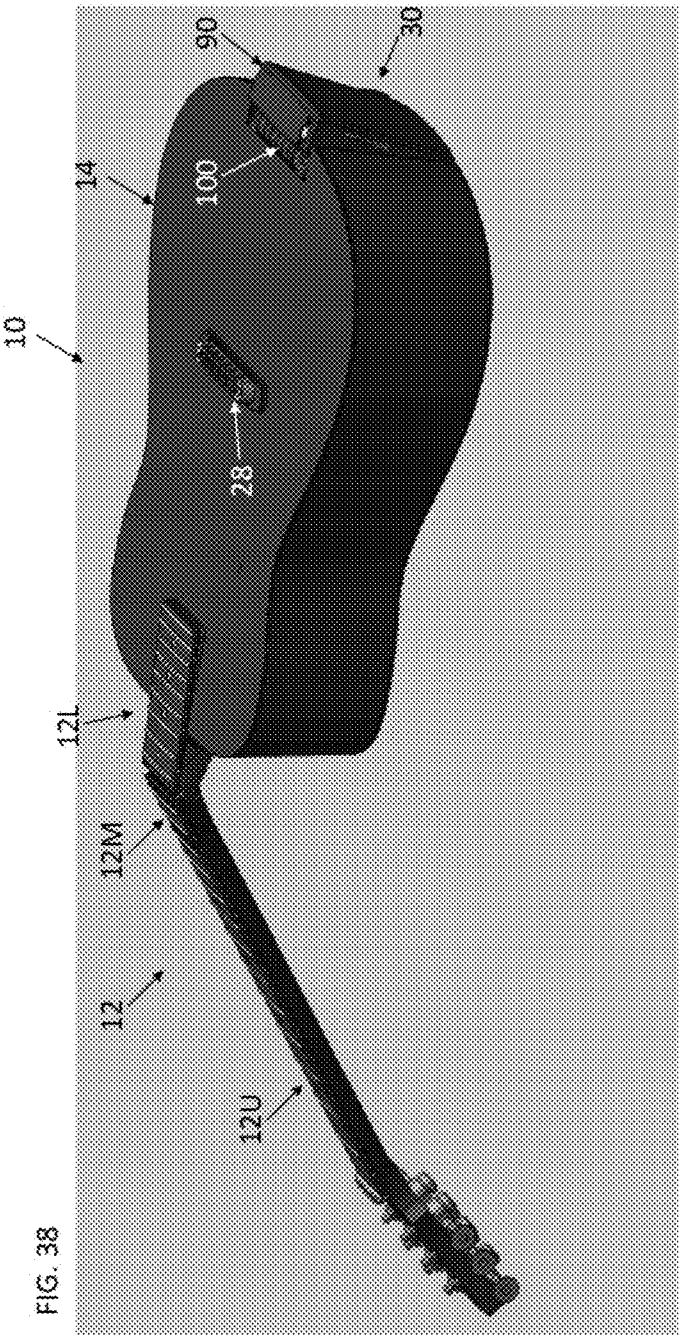
FIGS. 38-39 are perspective and partial sectional side views of the foldable acoustic guitar of FIGS. 1-2 illustrating a step in the folding process, namely a subsequent step of folding the neck and the associated operation of the actuator assembly according to aspects of the present invention.
Figure 39:
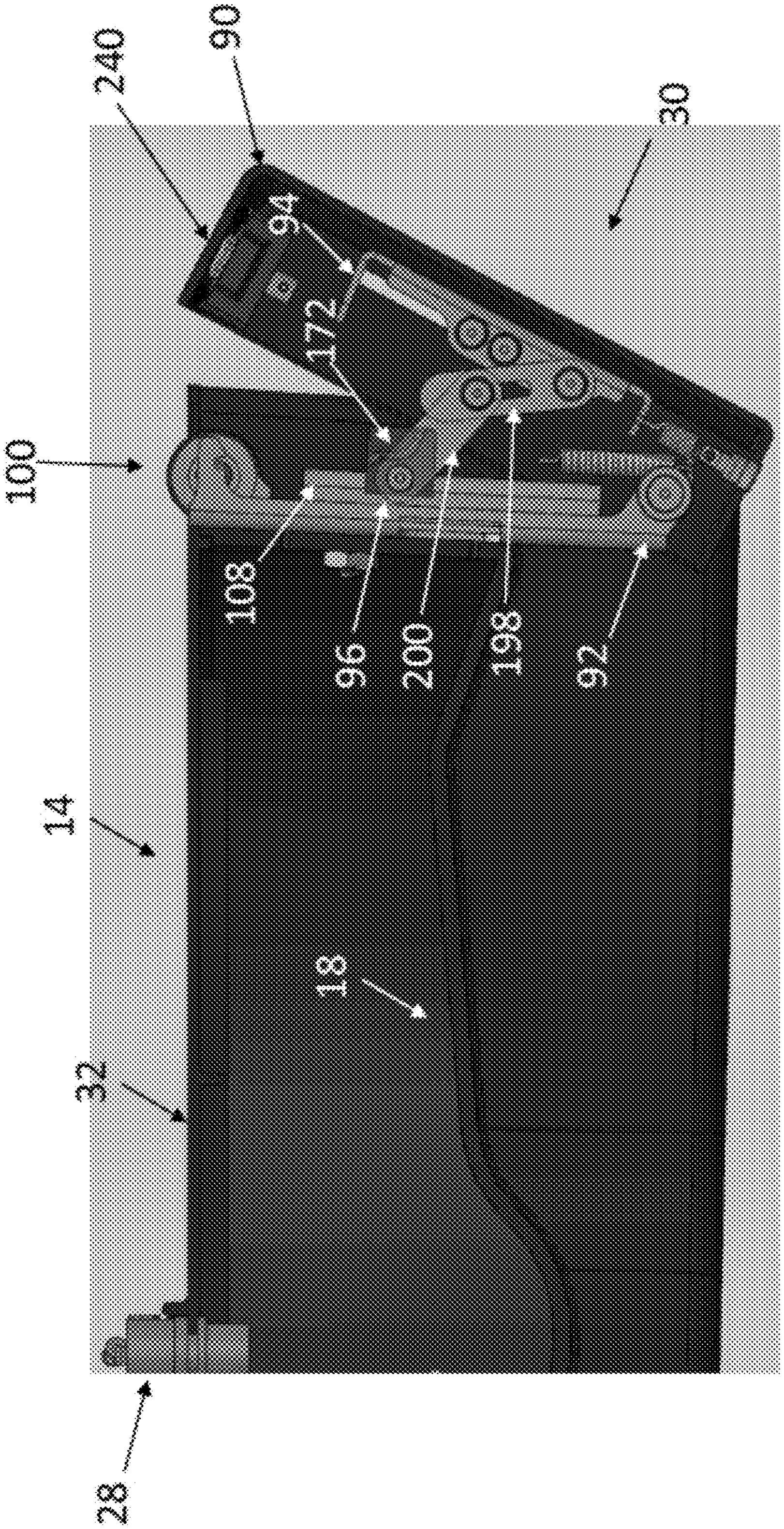
Figure 40:
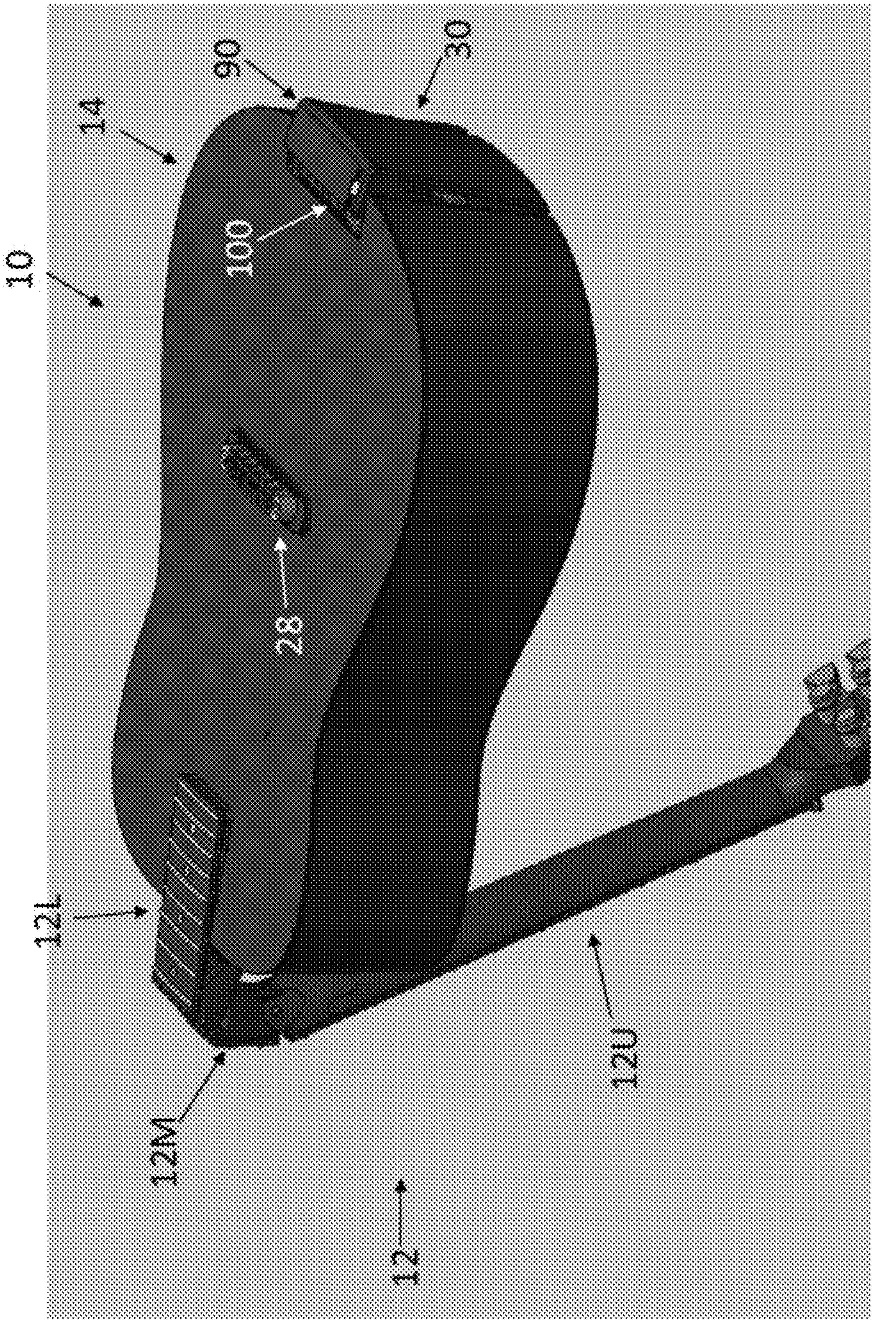
FIGS. 40-41 are perspective and partial sectional side views of the foldable acoustic guitar of FIGS. 1-2 illustrating a step in the folding process, namely a subsequent step of continuing to fold the neck and the associated operation of the actuator assembly according to aspects of the present invention.
Figure 41:
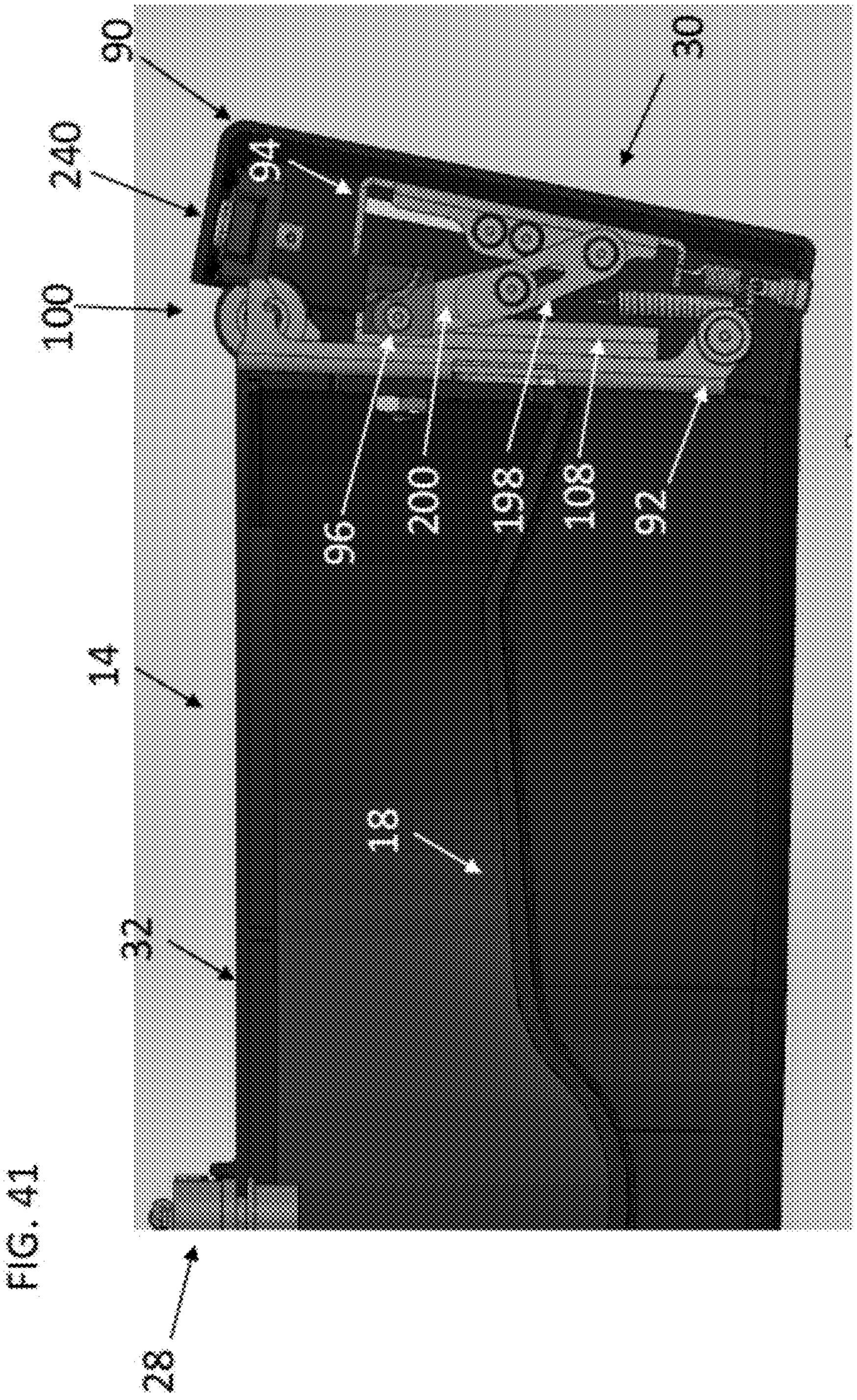
Figure 42:
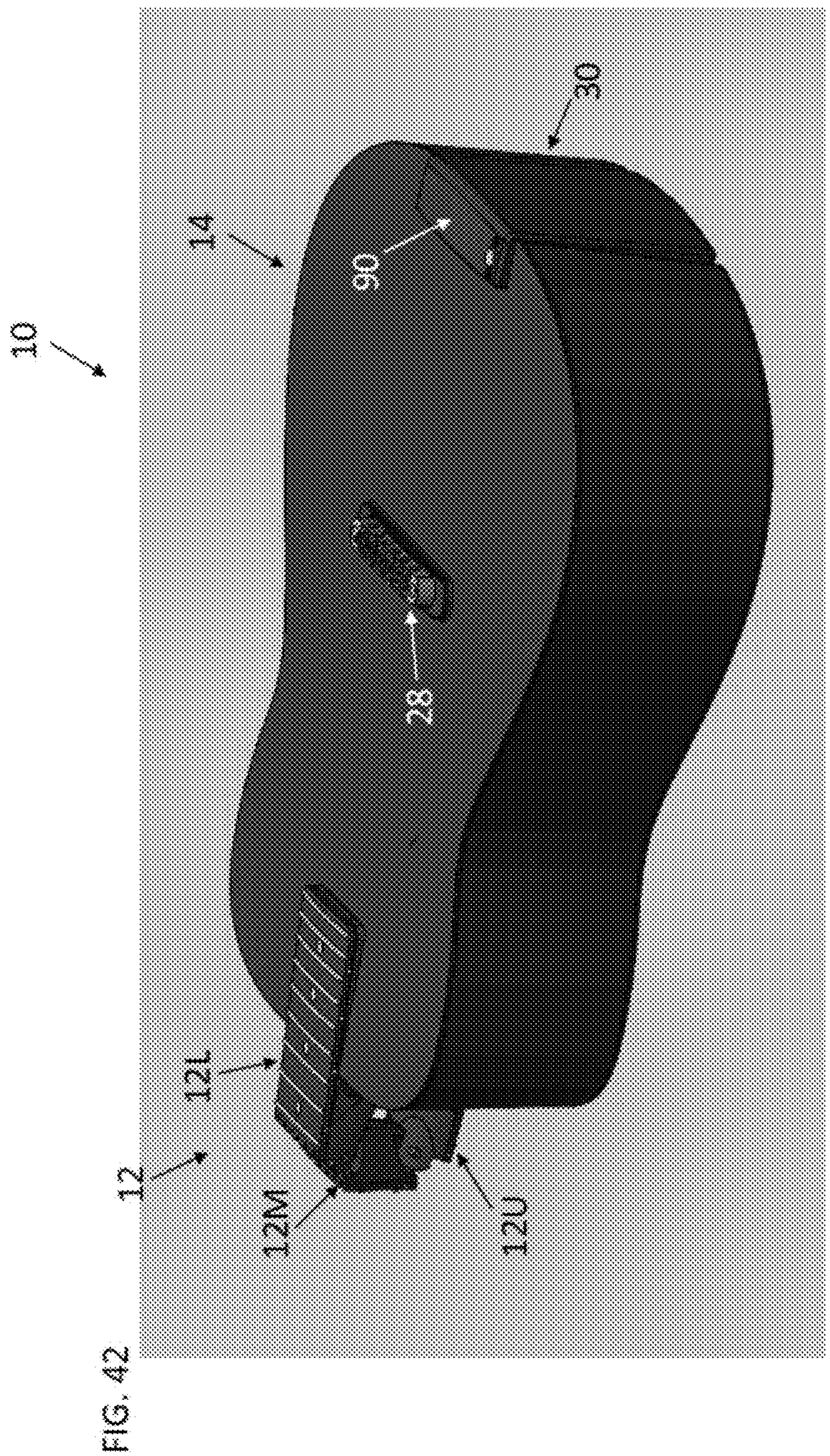
FIGS. 42-43 are perspective and partial sectional side views of the foldable acoustic guitar of FIGS. 1-2 illustrating the final result, namely a fully folded guitar with the neck positioned with a neck recess in the back of the body and an actuator fully released according to aspects of the present invention.
Figure 43:
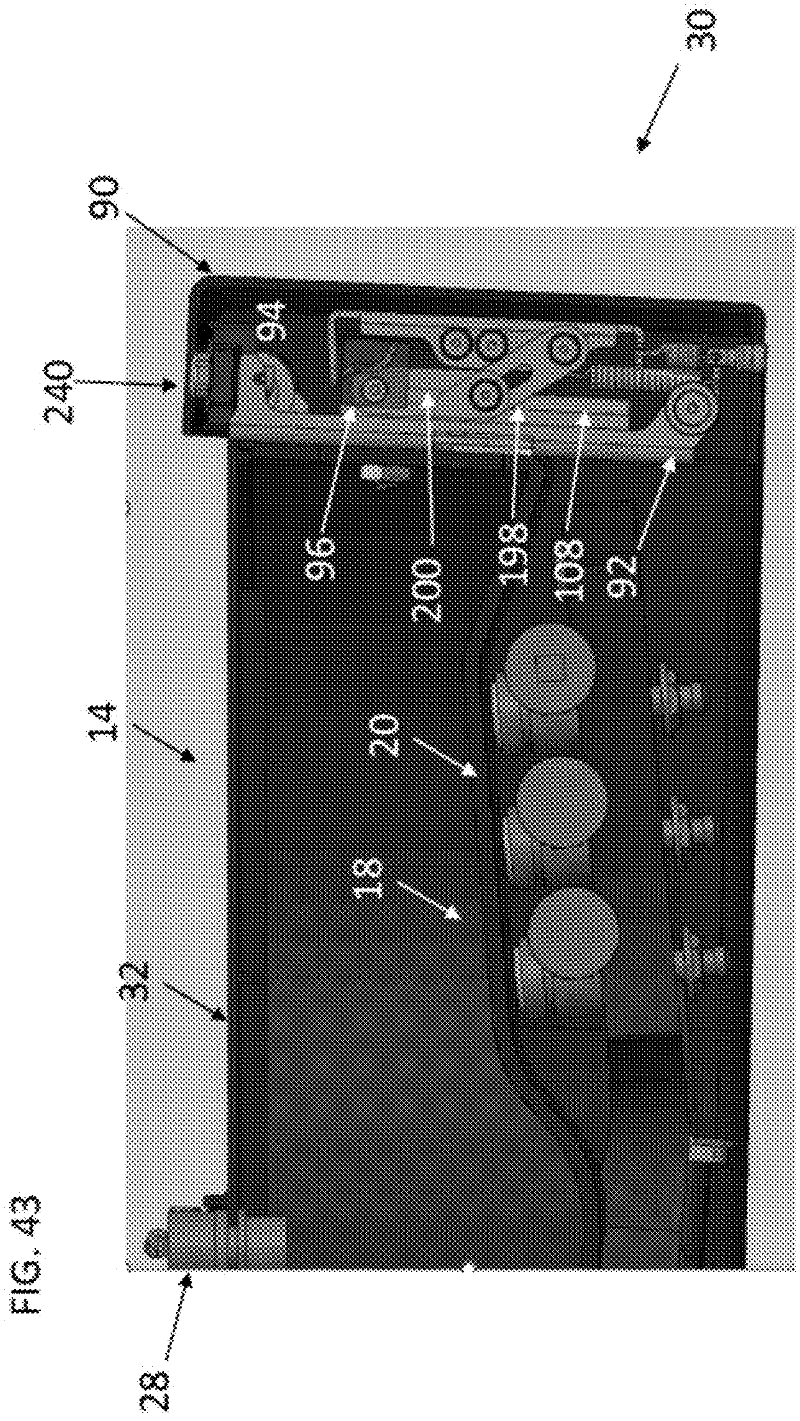

FIGS. 34-43 illustrate the process of folding the acoustic guitar 10 for storage or transportation. While in the playing position (FIG. 34), the actuator 30 is fully locked with the cover 90 closed and the tail piece 96 forced to the maximum distance along the rails 108, 110 of the chassis 92 as shown in FIG. 35. To start the folding process, the release button 240 is depressed by the user to open the cover 90 of the actuator 30 shown in FIG. 36. As shown in FIGS. 36-37, the tail piece 96 is located away towards the bottom of the actuator 30, given that the strings are coming off of full, playing tension (approximately 118 lbs.) when the actuator 30 is first opened. With the tail piece 96 released, the strings drop in tension to a foldable state (approximately 1-5 lbs., preferably 3 lbs.) such that the neck 12 can be folded as shown in FIG. 38. During the process of folding the neck 12 about middle neck section 12M (FIGS. 38, 40, 42), the tail piece 96 translates (moves) upwards along the rails 108, 110 of the actuator chassis 92 towards the top (sound board) of the body 14 and the cover 90 is returned towards the closed state shown in FIGS. 39, 41, 43). In the fully folded state of FIG. 42, the acoustic guitar 10 may be conveniently stored or transported in a protective case of suitable shape and size that approximates the shape of the folded guitar 10.

Figure 44:
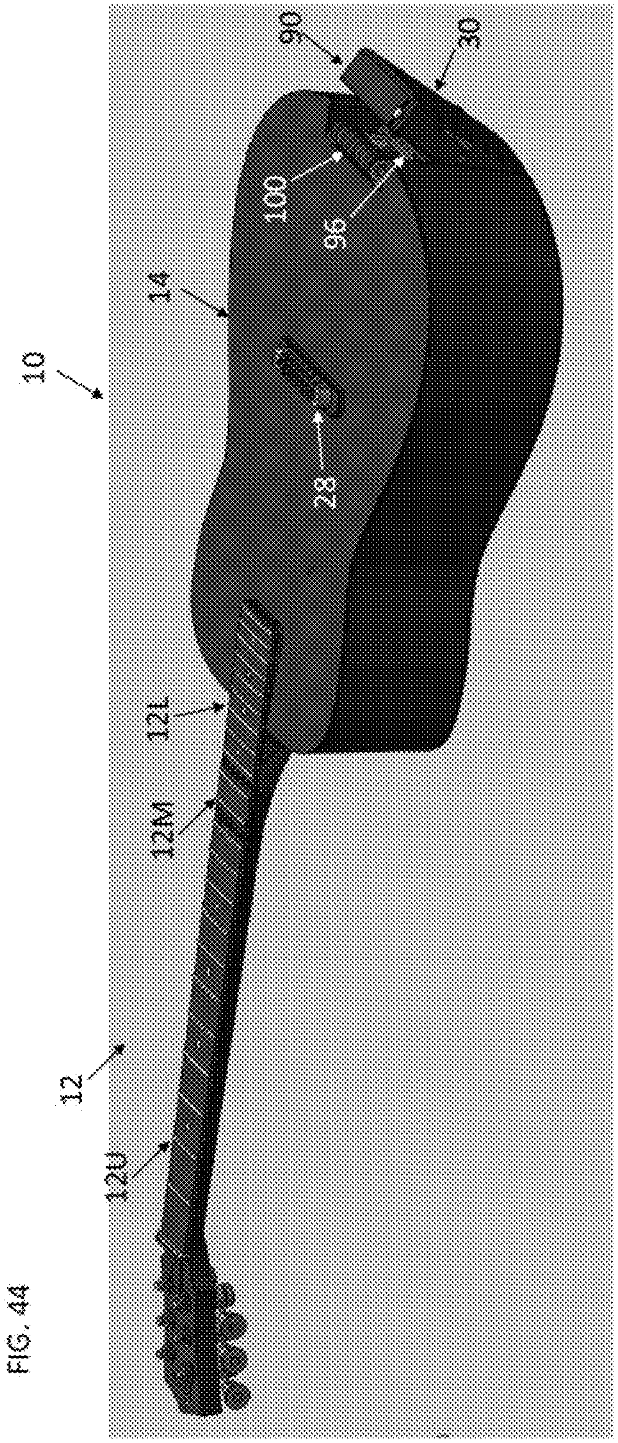
FIGS. 44-45 are perspective and partial sectional side views of the foldable acoustic guitar of FIGS. 1-2 illustrating an initial step in the unfolding process, namely straightening the neck and opening the actuator according to aspects of the present invention.
Figure 45:
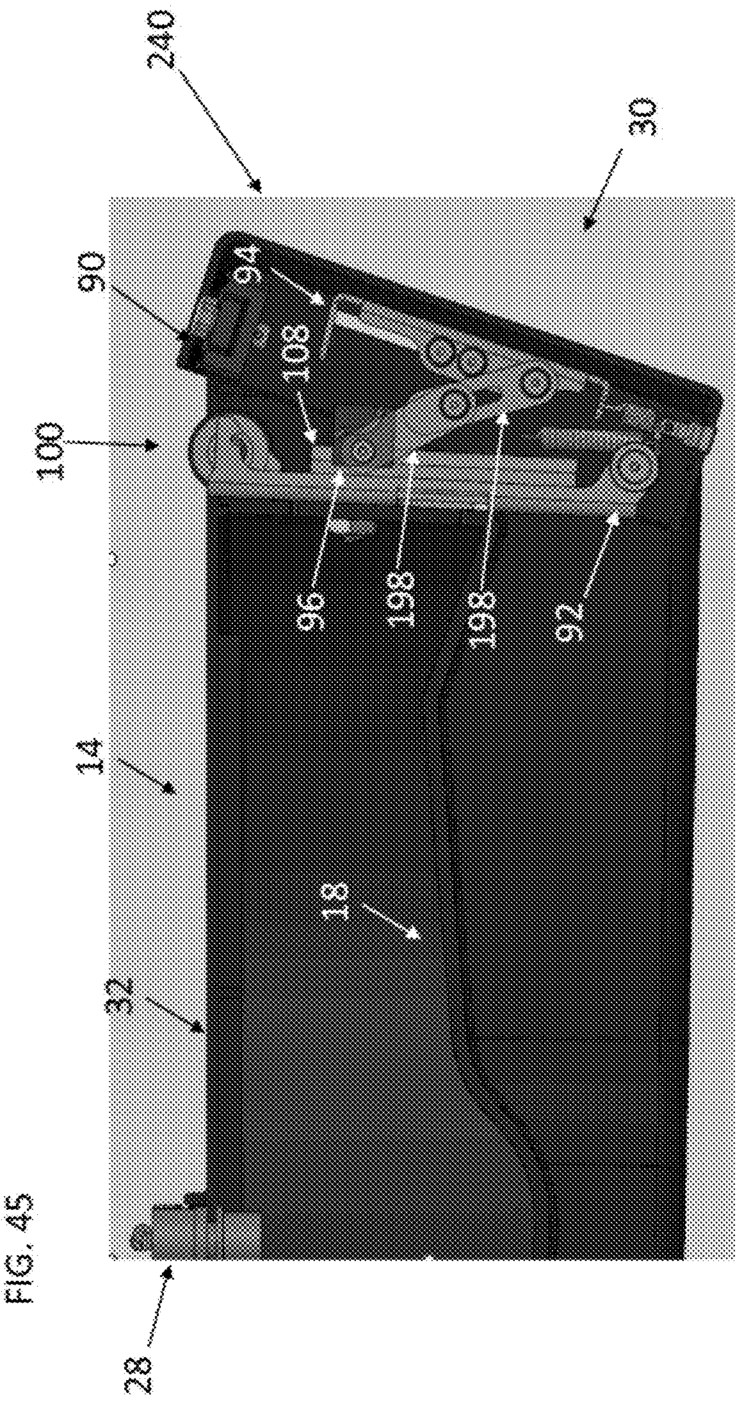
Figure 46:
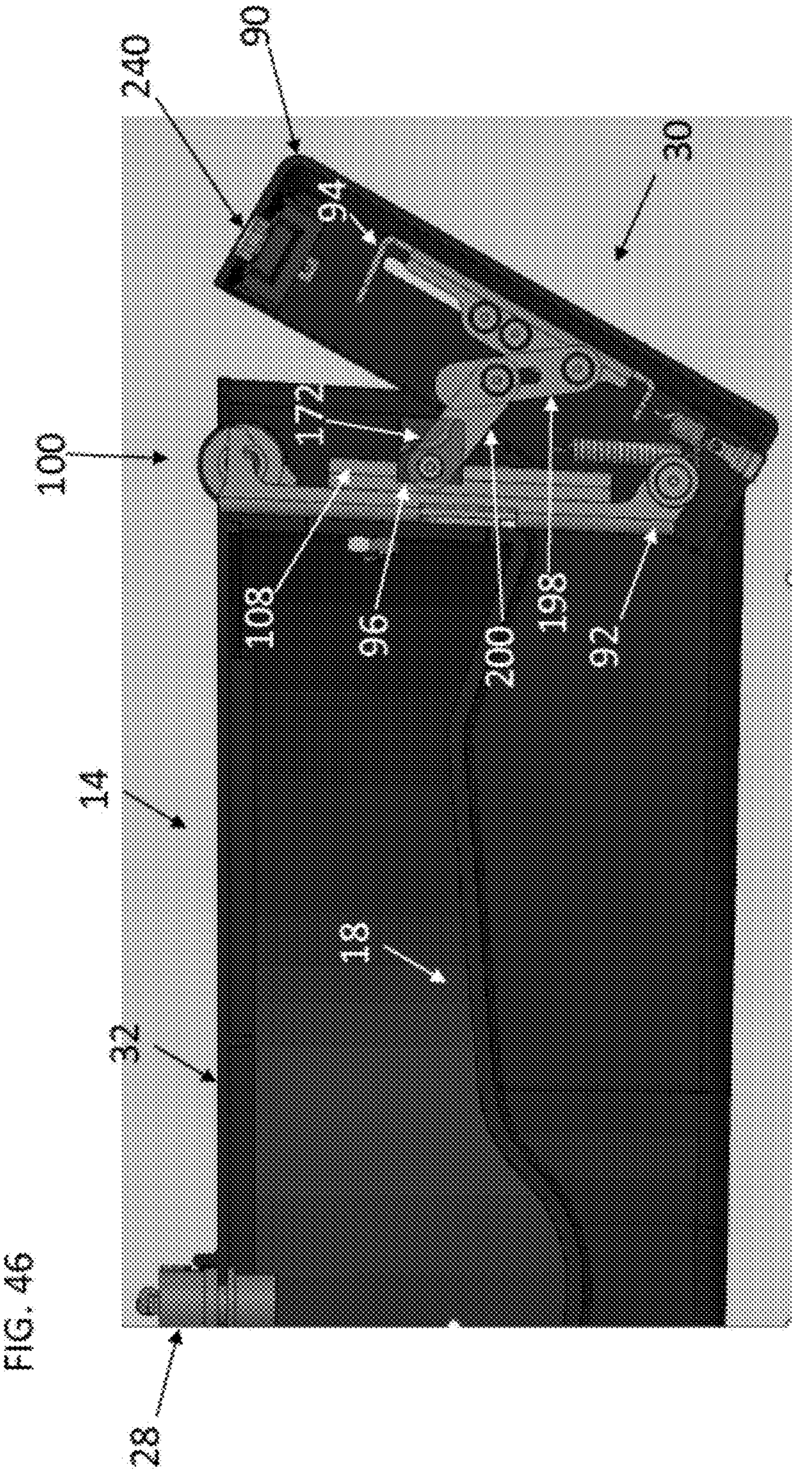
Figure 47:
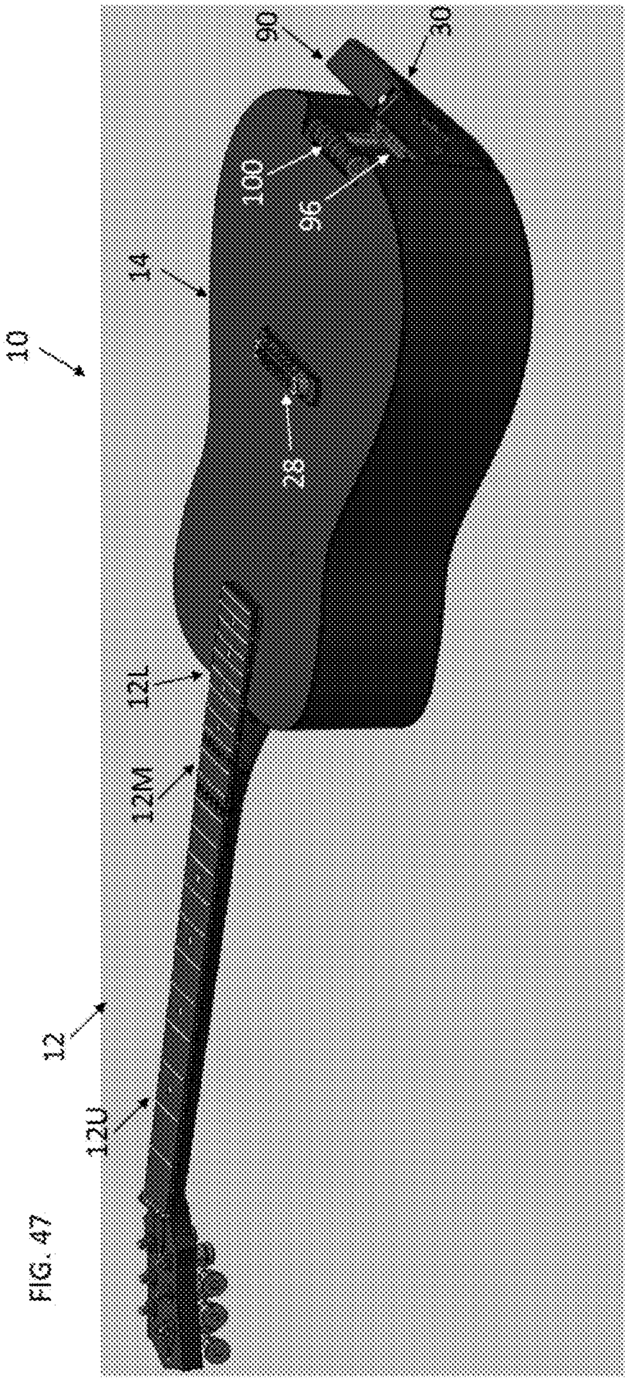
FIGS. 47-49 are perspective and partial sectional side views of the foldable acoustic guitar of FIGS. 1-2 illustrating a subsequent step in the unfolding process, namely continuing to close the actuator to pull the tail piece downwards (FIG. 48) and to thereafter push the actuator downwards (FIG. 49) according to aspects of the present invention.
Figure 48:
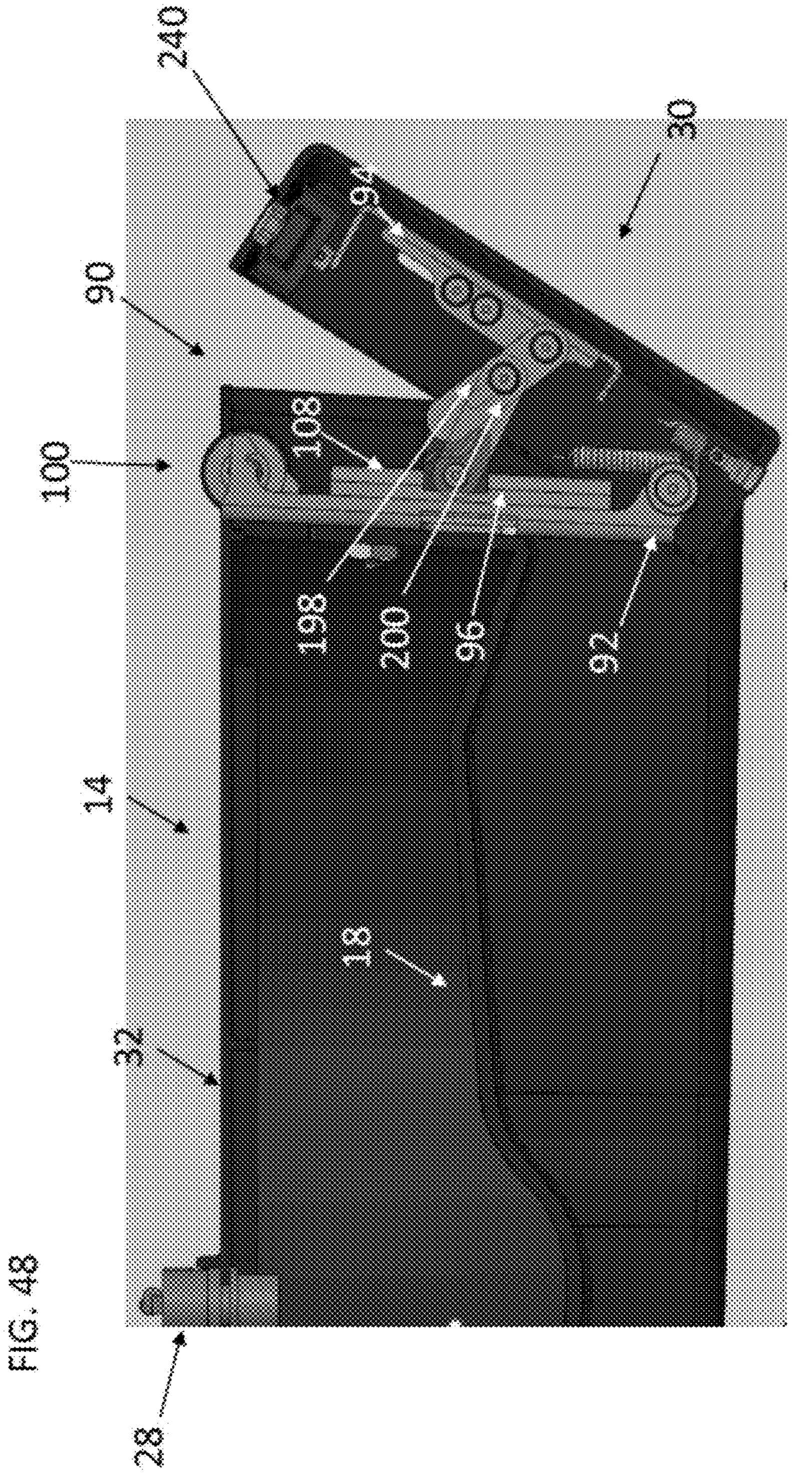
Figure 49:
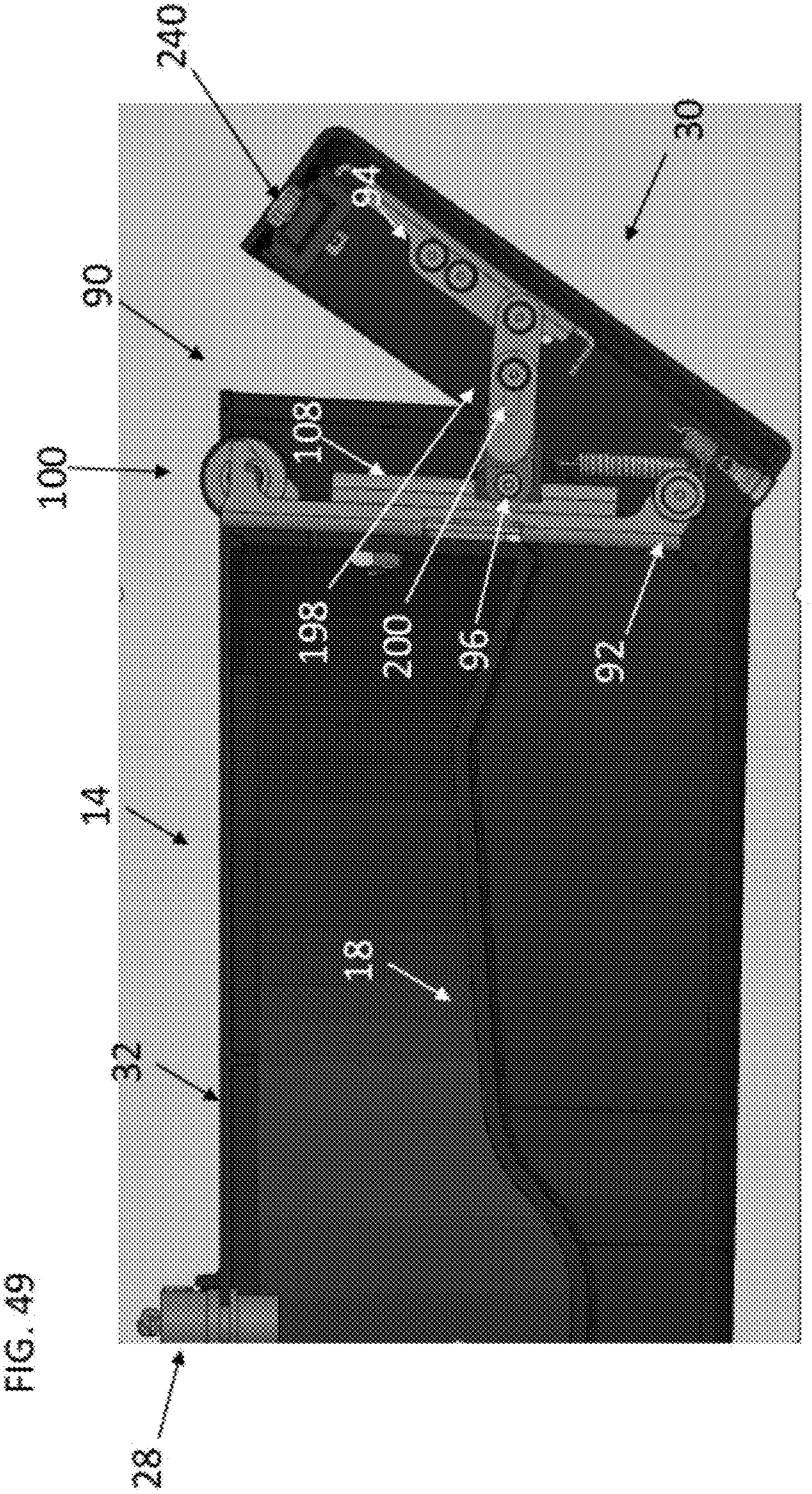
Figure 50:
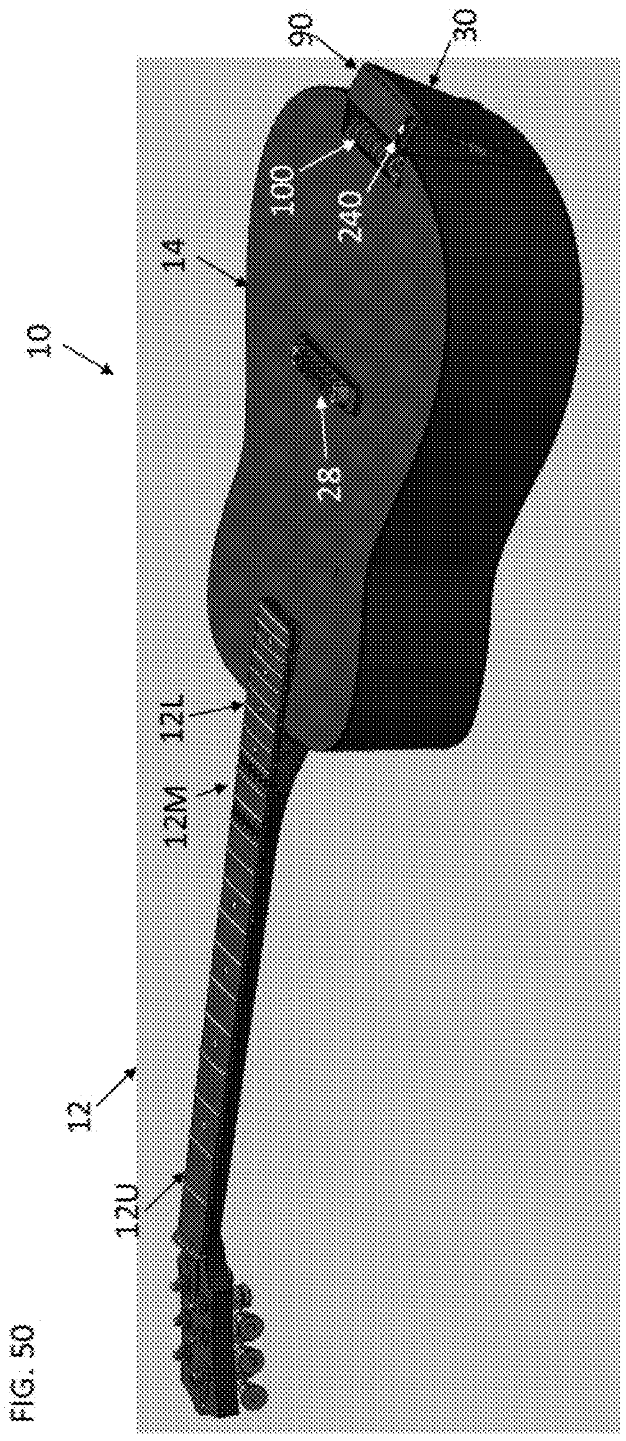
FIGS. 50-51 are perspective and partial sectional side views of the foldable acoustic guitar of FIGS. 1-2 illustrating a subsequent step in the unfolding process, namely continuing to close the actuator to further push the actuator downwards into the fully locked position to retention the strings for playing according to aspects of the present invention.
Figure 51:
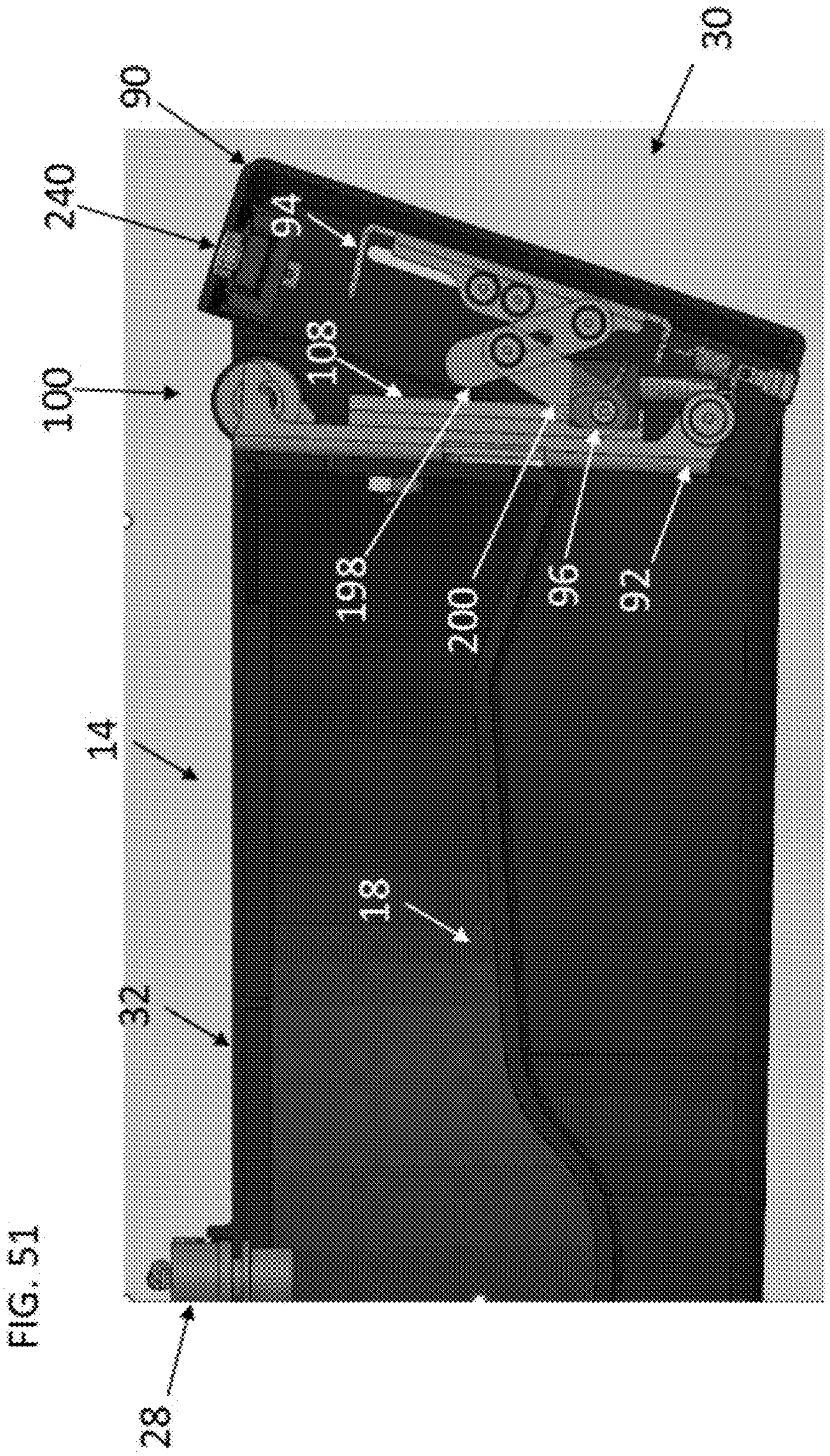
Figure 52:
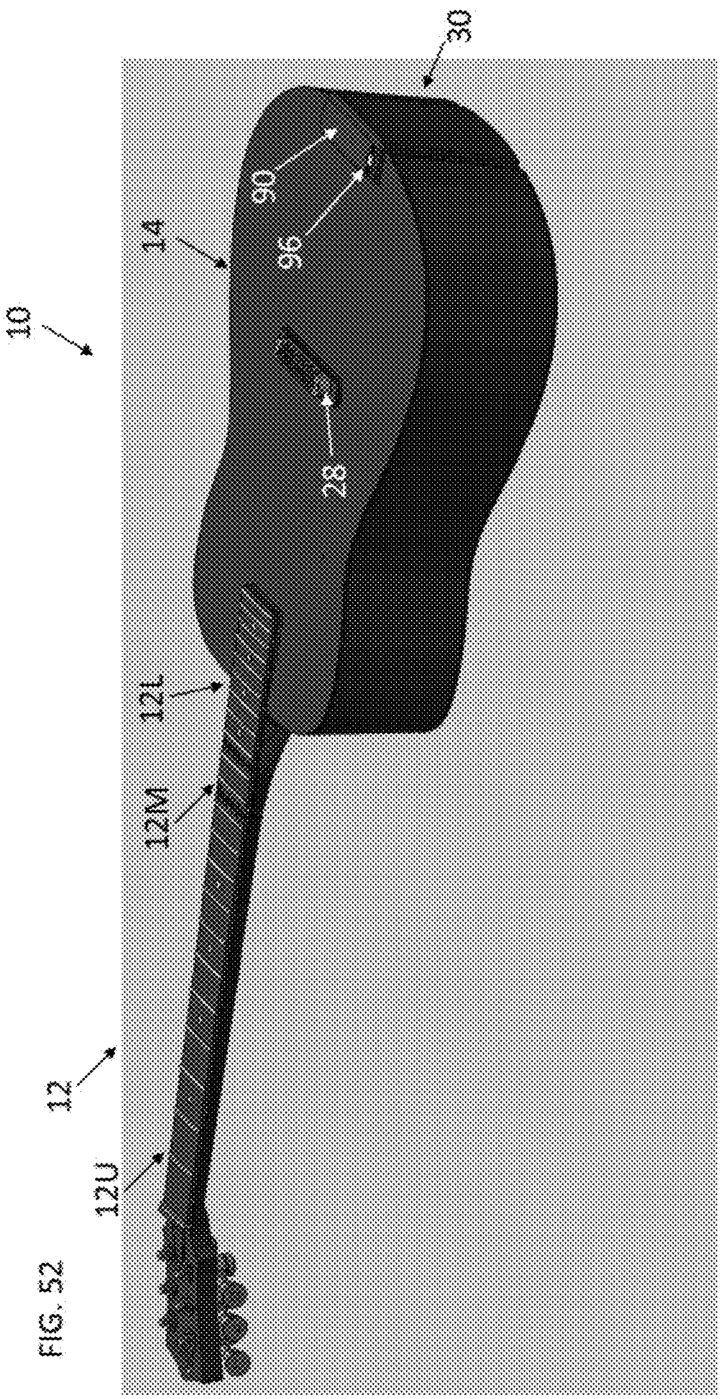
FIGS. 52-53 are perspective and partial sectional side views of the foldable acoustic guitar of FIGS. 1-2 illustrating the final result, namely, a fully unfolded guitar with the neck deployed straight for playing and an actuator fully locked according to aspects of the present invention.
Figure 53:
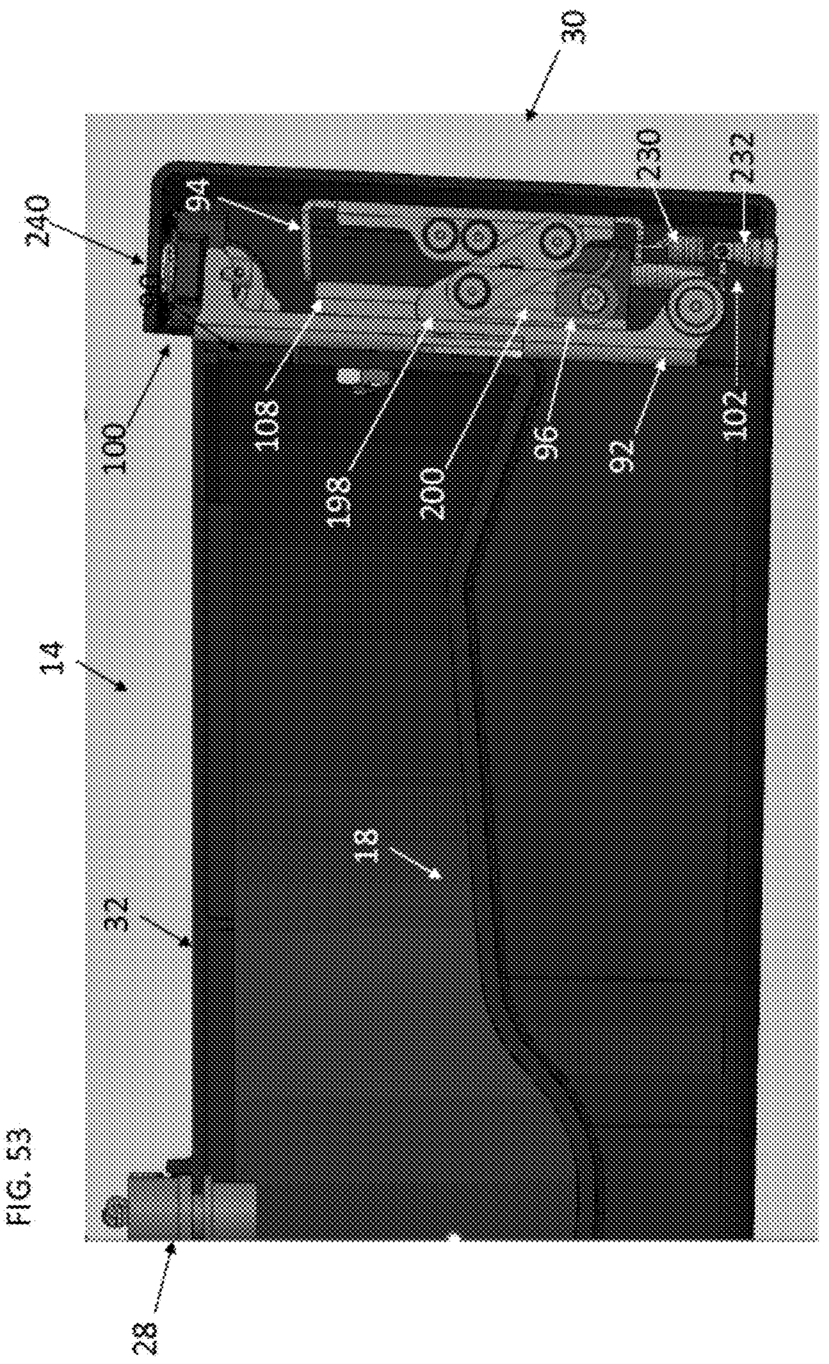

FIGS. 44-53 illustrate the process of unfolding the acoustic guitar 10 for playing. From the folded configuration (FIG. 42), the neck is straightened and the cover 90 is opened by depressing (pushing in) the release button 240 of the release system 104 of the actuator 30 as shown in FIG. 44. While the upper neck section 12U and middle neck section 12M are brought into alignment with the lower neck section 12L, as shown in FIGS. 45 and 46 the tail piece 96 is pulled downwards along the rails 108, 110 of the actuator chassis 92 due to the springs coupled between the tail piece 96 and the ends 138, 140 of the spring holder tabs 134, 136, respectively, of the actuator chassis 92 (FIG. 27). At this point, a user places his or her fingers into the open actuator 30 and under the finger purchase section 142 (FIG. 47) and pulls up to the force the tail piece 96 further downward along the rails 108, 110 due to the mechanical coupling from the linkage assembly 98 as shown in FIGS. 48-49. The inner connecting links 198, 202 are forced into contact with the curved recess sections 172, 174 (FIG. 29) as the handle 94 is raised under direction of the user (FIGS. 47-49) to drive the tail piece 96 downward further along the rails 108, 110 beyond that accomplished via the springs and the outer connecting links 200, 204 as shown in FIGS. 45-46. Once the tail piece 96 is forced below the PEM stud and nut assemblies 206, 208 (due to contact between the inner connecting links 198, 202 and the curved recess sections 172, 174 as the handle 94 is raised within the actuator 30), the PEM stud and nut assemblies 206, 208 are forced into translation (movement) within the elongated slots within the inner connecting links 198, 202 (FIG. 31) such that the ends of the inner connecting links 198, 202 are forced along the curved recess sections 172, 174 of the tail piece 96 and towards the string roller 100 as the cover 90 is returned towards the closed position as shown in 51 and the final closed position shown in FIGS. 52-53.

Figure 54:
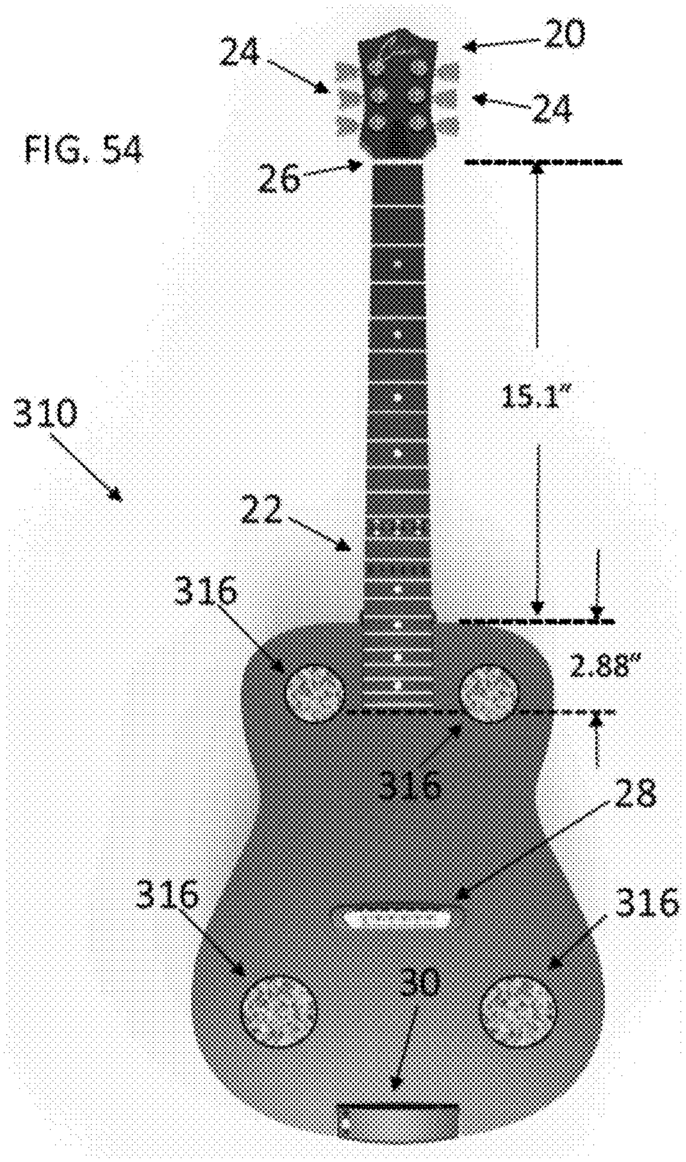
FIG. 54 is a front view of an alternate embodiment of the foldable acoustic guitar of FIGS. 1-2, having essentially all the same features except the substitution of one or more resonator cones within the sound hole(s) according to aspects of the present invention.

It is also within the scope of the present invention to provide the acoustic guitar 10 shown herein with additional functionality and/or components, including but not limited to onboard electronics (e.g. pre-amps, tuners, lights, etc. . . . ) and/or one or more resonator cones 316 as shown in FIG. 54. A resonator cone 316 works by transferring the vibrations from the strings of the guitar 10, through the bridge 28, to the resonator cone(s) 316 located on the soundboard 34 of the body 14 of the guitar 10. The resonator cone(s) 316 may be constructed from any of a variety of suitable materials, including any suitable metal, which aids in directing the resonance of the guitar 10 to produce a brighter tone than traditional steel-string acoustic guitars.

Any of the features or attributes of the above-described embodiments and variations can be used in combination with any of the other features and attributes of the above-described embodiments and variations as desired. The foldable acoustic guitar 10 set forth herein overcome or at least improve upon the disadvantages of the prior art by providing a reduced profile for ease of travel and predictable tuning and quality guitar play.

From the foregoing disclosure and detailed description of certain preferred embodiments, it is also apparent that various modifications, additions and other alternative embodiments are possible without departing from the true scope and spirit. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A foldable acoustic guitar, comprising:

a body having an upper surface, a lower surface, a first end, a second end opposite said first end, an internal acoustic chamber extending between said upper and lower surfaces and said first and second ends, a neck recess formed within said lower surface and extending between said first and second ends, and an actuator recess formed at said second end and extending between said upper and lower surfaces;

a foldable neck assembly mounted to said body at said first end of said body, said foldable neck assembly having a mid-neck hinge assembly; and an actuator assembly mounted within said actuator recess, said actuator assembly including at least one rail extending generally perpendicularly relative to said upper surface of said body, a tail piece slidably engaged with said at least one rail, and a rotatable handle connected with said tail piece to selectively loosen and tighten strings coupled to said tail piece to enable folding and unfolding said foldable neck about said mid-neck hinge assembly.

2. The foldable acoustic guitar of claim 1, wherein said actuator assembly includes a string roller positioned parallel to said tail piece for redirecting strings coupled to said tail piece to the upper surface of said body.

3. The foldable acoustic guitar of claim 1, wherein said actuator assembly includes a release assembly to selectively release said handle to enable folding and unfolding said mid-neck hinge of said neck.

4. The foldable acoustic guitar of claim 1, wherein said actuator assembly includes at least one handle spring connected to said handle to automatically return said handle to a first position after being manually translated to a second position.

5. The foldable acoustic guitar of claim 1, wherein said actuator assembly includes at least one tail piece spring connected to the tail piece to maintain a minimum tension on strings coupled to said tail piece during the folding and unfolding said foldable neck assembly.

6. The foldable acoustic guitar of claim 1, wherein said actuator assembly includes a chassis configured to be mounted within said actuator recess of said body, said chassis including said at least one rail, tabs for holding a string roller, and apertures for rotatably connecting said handle to said chassis.

7. The foldable acoustic guitar of claim 1, further comprising a cover coupled to said actuator assembly.

8. The foldable acoustic guitar of claim 1, wherein said body includes at least one sound hole formed in said upper surface.

9. The foldable acoustic guitar of claim 8, further comprising a resonator disposed in said at least one sound hole of said upper surface of said body.

10. The foldable acoustic guitar of claim 1, further comprising at least one of a pre-amplifier, on-board electronics, and a transducer mounted to said body.

11. The foldable acoustic guitar of claim 1, wherein said body includes at least one sound hole formed in a side of said body in between said upper and lower surface.

12. The foldable acoustic guitar of claim 1, wherein a portion of said foldable neck assembly is positioned within said neck recess of said body while said guitar is in a folded state.

13. A foldable acoustic guitar, comprising:

a hollow body including at least one sound hole, a neck recess, and an actuator recess, said neck recess formed within a lower surface and extending between a first end and a second end, said actuator recess formed at said second end and extending between an upper and a lower surface, and said at least one sound formed in said upper surface;

a foldable neck assembly mounted to said body at said first end of said body, said foldable neck assembly having a mid-neck hinge assembly defining a lower neck section, a middle neck section, and an upper neck section, wherein said upper neck section is configured to be received within said neck recess while said guitar is in a folded configuration; and an actuator assembly mounted within said actuator recess, said actuator assembly including a tail piece configured to move up and down along at least one rail extending generally perpendicularly relative to said upper surface of said body, and a rotatable handle connected with said tail piece to selectively loosen and tighten strings coupled to said tail piece to enable folding and unfolding said foldable neck about said mid-neck hinge assembly.

14. The foldable acoustic guitar of claim 13, wherein said actuator assembly includes a string roller positioned parallel to said tail piece for redirecting strings coupled to said tail piece to the upper surface of said body.

15. The foldable acoustic guitar of claim 13, wherein said actuator assembly includes a release assembly to selectively release said handle to enable folding and unfolding said mid-neck hinge of said neck.

16. The foldable acoustic guitar of claim 13, wherein said actuator assembly includes at least one handle spring connected to said handle to automatically return said handle to a first position after being manually translated to a second position.

17. The foldable acoustic guitar of claim 13, wherein said actuator assembly includes at least one tail piece spring connected to the tail piece to maintain a minimum tension on strings coupled to said tail piece during the folding and unfolding said foldable neck assembly.

18. The foldable acoustic guitar of claim 13, wherein said actuator assembly includes a chassis configured to be mounted within said actuator recess of said body, said chassis including said at least one rail, tabs for holding a string roller, and apertures for rotatably connecting said handle to said chassis.

19. The foldable acoustic guitar of claim 13, further comprising a cover coupled to said actuator assembly.

20. The foldable acoustic guitar of claim 8, further comprising a resonator disposed in said at least one sound hole of said upper surface of said body.

* * * * *